(12) United States Patent
Kacher et al.

(10) Patent No.: US 8,799,235 B2
(45) Date of Patent: Aug. 5, 2014

(54) DATA DE-DUPLICATION SYSTEM

(75) Inventors: Donald Kacher, Waltham, MA (US); Kishore Srirambhatla, Hyderabad (IN); Nanda Venugopal, Bangalore (IN); Abhishek Raizada, Indore (IN); Abhay Kulkarni, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 69 days.

(21) Appl. No.: 13/606,248

(22) Filed: Sep. 7, 2012

(65) Prior Publication Data

US 2014/0074801 A1 Mar. 13, 2014

(51) Int. Cl.
*G06F 17/30* (2006.01)

(52) U.S. Cl.
USPC .......................................... 707/687; 707/692

(58) Field of Classification Search
USPC .................................. 707/687, 692
See application file for complete search history.

(56) References Cited

U.S. PATENT DOCUMENTS

| | | | |
|---|---|---|---|
| 7,092,956 B2 | 8/2006 | Ruediger | |
| 7,200,604 B2 | 4/2007 | Forman et al. | |
| 7,685,090 B2 | 3/2010 | Chaudhuri et al. | |
| 7,809,696 B2 * | 10/2010 | Ben Harush | 707/692 |
| 8,046,340 B2 * | 10/2011 | Harush | 707/692 |
| 2004/0044673 A1 * | 3/2004 | Brady et al. | 707/100 |
| 2008/0027958 A1 | 1/2008 | Kapoor et al. | |
| 2008/0162580 A1 * | 7/2008 | Ben Harush | 707/200 |
| 2009/0037488 A1 * | 2/2009 | Abrams | 707/201 |
| 2010/0312799 A1 * | 12/2010 | Harush | 707/780 |
| 2010/0318499 A1 | 12/2010 | Arasu et al. | |
| 2011/0246734 A1 * | 10/2011 | Umbehocker | 711/162 |
| 2012/0158670 A1 * | 6/2012 | Sharma et al. | 707/692 |

OTHER PUBLICATIONS

Jay Nathan, "Fuzzy Lookups and Groupings Provide Powerful Data Cleansing Capabilities", Using the SQL Server Integration Services for Data Cleansing, © 2012 Microsoft Corporation, http://msdn.microsoft.com/en-us/magazine/cc163731(printer).aspx, Apr. 20, 2012, pp. 1-6 (last visited Sep. 6, 2012).

Timothy E. Ohanekwu et al., "A Token-Based Data Cleaning Technique for Data Warehouse Systems", School of Computer Science, University of Windsor, Windsor, Ontario, Canada N9B 3P4, http://davinci.newcs.uwindsor.ca/~cezeife/dqcis03.pdf (last visited Sep. 6, 2012).

Dupecatcher, "Powerful Salesforce Deduplication", http://www.dupecatcher.com/downloads/DupeCatcher_Datasheet.pdf, Copyright © 2011 Symphonic Source Salesforce (last visited Sep. 6, 2012).

ETL-tools.com, "Data Deduplication Processing Data", http://www.dbsoftlab.com/etl-tools/processing-data/data-deduplication.html, Copyright © 2012 DB Software Laboratory—supplier of Business Automation and ETL software, pp. 1-2 (last visited Sep. 6, 2012).

* cited by examiner

*Primary Examiner* — Kim Nguyen
(74) *Attorney, Agent, or Firm* — Miles & Stockbridge P.C.

(57) ABSTRACT

A data de-duplication system is provided that supports the loading and integration of data from multiple data sources. The data de-duplication system identifies and merges duplicate dimension data records that describe the same entity by creating a single dimension data record that is identified as a single best record ("SBR"). The data de-duplication system further adjusts foreign keys that reference the duplicate dimension data records so that the foreign keys correctly reference the merged dimension data record (i.e., the SBR).

17 Claims, 13 Drawing Sheets

1

DATA DE-DUPLICATION SYSTEM

FIELD

One embodiment is directed to a computer system, and more particularly, to a computer system that manages data.

BACKGROUND

A data warehouse can be used to store data used for reporting and analysis, and can be organized into dimension tables and fact tables. A fact table is a table that can store fact data, typically numerical, about the state of a specific process. A dimension table (or "dimension") is a table that can store dimension data about a context in which the specific process is performed. In a typical business data warehouse, fact data can include data such as sales and inventory, and dimension data can include data such as date and store. Each data record in a fact table can have one or more foreign keys which can relate the data record to each dimension. Thus, for example, a specific sales transaction can have foreign key values that associate the specific sales transaction to a specific date and store.

As an example of a data warehouse, Oracle Clinical Development Analytics ("OCDA") is an analytics application that can provide dashboards containing tables and graphs that present actionable information about clinical operations and data management. OCDA's reports are drawn from a data warehouse, where the data warehouse is populated from one or more source transactional databases (or "source databases"), such as Oracle Clinical ("OC") and Siebel Clinical ("SC").

The OCDA data warehouse can store one or more fact data records concerning several processes, such as conducting clinical trials, getting sites prepared to conduct a study, enrolling subjects, collecting data from subjects, cleaning subject data, or recording monitoring visits. Each fact data record can relate to several dimensions, such as date, study, site, and investigator.

In the case of the OCDA data warehouses (and typical of data warehouses in general), each fact data record originates from only one source transactional database. But each source transactional database may carry its own copy of a dimension data record describing the same entity. For example, a single investigator can be present in both a study management database (such as the SC database), and the data management database (such as the OC database).

SUMMARY

One embodiment is directed to a data de-duplication system that manages duplicate data originating from a plurality of data sources. The data de-duplication system generates one or more de-duplication instructions for a data warehouse, where the one or more de-duplication instructions identify dimension data records that are considered duplicate dimension data records and identify a single dimension data record that represents the duplicate dimension data records. The data de-duplication system further receives dimension data from a plurality of data sources, where the dimension data includes one or more dimension data records. The data de-duplication system further identifies at least two duplicate dimension data records by applying the one or more de-duplication instructions to the received dimension data. The data de-duplication system further replaces the at least two duplicate dimension data records with the single dimension data record within the data warehouse. The data de-duplication system further adjusts one or more foreign keys of at least one data record within the data warehouse to reference the single dimension data record.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
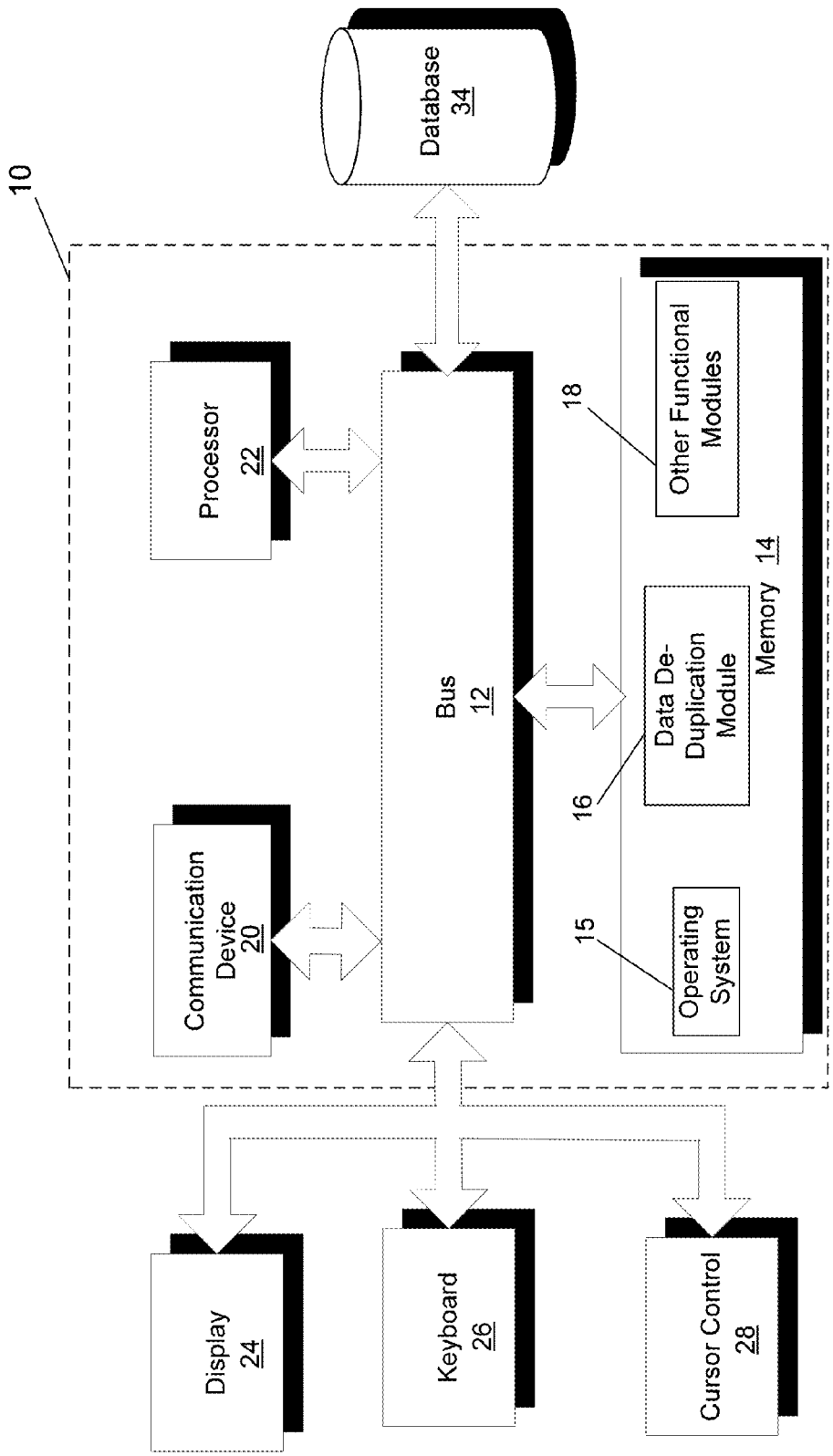
FIG. 1 illustrates a block diagram of a data de-duplication system that can implement an embodiment of the invention.

According to an embodiment, a data de-duplication system can be provided that supports the loading and integration of data from multiple data sources. The data de-duplication system can identify and properly merge duplicate dimension data records (such as duplicate dimension data records from multiple data sources) that describe the same entity by creating a single dimension data record that is identified as a single best record ("SBR"). The data de-duplication system can further adjust foreign keys that reference the duplicate dimension data records so that the foreign keys correctly reference the merged dimension data record (i.e., the SBR). This can avoid the creation of duplicate dimension data records within a data warehouse, when the data warehouse loads data from multiple source databases. The data de-duplication system can further unmerge the duplicate dimension data records by replacing the SBR with the original duplicate dimension data records. The data de-duplication system can further adjust foreign keys that reference the SBR so that the foreign keys correctly reference the original duplicate dimension data records.

Existing solutions for managing duplicate records as part of integrating data from multiple sources falls into two types: Integration and Mastering. In Integration, one source database is treated as a "source of truth" for a dimension, and its values are pushed into the dimension data records for the other source databases. In Mastering, a separate database is constructed to serve as the "source of truth" for the values for a dimension, and all source application databases receive copies of the official values.

Both of these solutions require important changes to the source applications and their databases: (a) a column must be added to each source database to hold a globally unique identity ("ID") for each dimension, where the ID is an ID generated in the "source of truth" database, and is used for matching up fact data records to dimension data records when they are loaded into the data warehouse; (b) all data records created in the (non-"source of truth") source database dimensions have to be modified so that they hold values that they would have had if the solution had been in place for the entire life of the database; and (c) all source applications (except for the "source of truth" in the Integration solution") have to be modified such that users can no longer set values of the dimension via the application, and instead have those values be set by the Integration or Mastering solution. More precisely, the dimension attributes that are set via the "source of truth" cannot be modified by the application. Instead, the application must be modified so that those attributes that are set in the "source of truth" cannot be modified by the application. However, the application must remain able to update the remaining attributes once a new data record has been created by the "source of truth."

These changes can have both immediate and ongoing costs. Applying these changes requires careful analysis, modification to the application and its database structure, and modifications to the contents of the database. Changes to the data must be carefully recorded and validated. For some applications, such modifications can cause loss of support by the application's vendor, since the vendor can no longer be sure of being able to replicate reported problems. Problems can also arise when upgrades to the application software arrive. At a minimum, the work to disable creation of dimension data records has to be re-done. Further, additional analysis must also be done to ensure that the solution will continue to work. In life sciences applications, where changes to programs and data are subject to strict regulatory scrutiny and penalties, these risks and costs can be substantial.

Embodiments of the invention can avoid the problems described above, as is further described in greater detail. Certain embodiments of the invention are described in relation to data warehouses for data associated with clinical trials. However, these are merely example embodiments, and in alternate embodiments, data warehouses that are to be loaded from multiple sources (and thus, that may contain duplicate dimensional data records) may contain any type of data records.

FIG. 1 illustrates a block diagram of a data de-duplication system 10 that can implement one embodiment of the invention. Data de-duplication system 10 includes a bus 12 or other communications mechanism for communicating information between components of data de-duplication system 10. Data de-duplication system 10 also includes a processor 22, operatively coupled to bus 12, for processing information and executing instructions or operations. Processor 22 may be any type of general or specific purpose processor. Data de-duplication system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Data de-duplication system 10 further includes a communication device 20, such as a network interface card or other communications interface, to provide access to a network. As a result, a user may interface with data de-duplication system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with data de-duplication system 10.

According to one embodiment, memory 14 can store software modules that may provide functionality when executed by processor 22. The modules can include an operating system 15, a data de-duplication module 16, as well as other functional modules 18. Operating system 15 can provide an operating system functionality for data de-duplication system 10. Data de-duplication module 16 can provide functionality for managing duplicate data originating from multiple data sources, as will be described in more detail below. In certain embodiments, data de-duplication module 16 can comprise a plurality of modules, where each module provides specific individual functionality for managing duplicate data originating from multiple data sources. Data de-duplication system 10 can also be part of a larger system. Thus, data de-duplication system 10 can include one or more additional functional modules 18 to include the additional functionality. For example, functional modules 18 may include modules that provide additional functionality, such as the "Oracle Clinical Development Analytics" product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
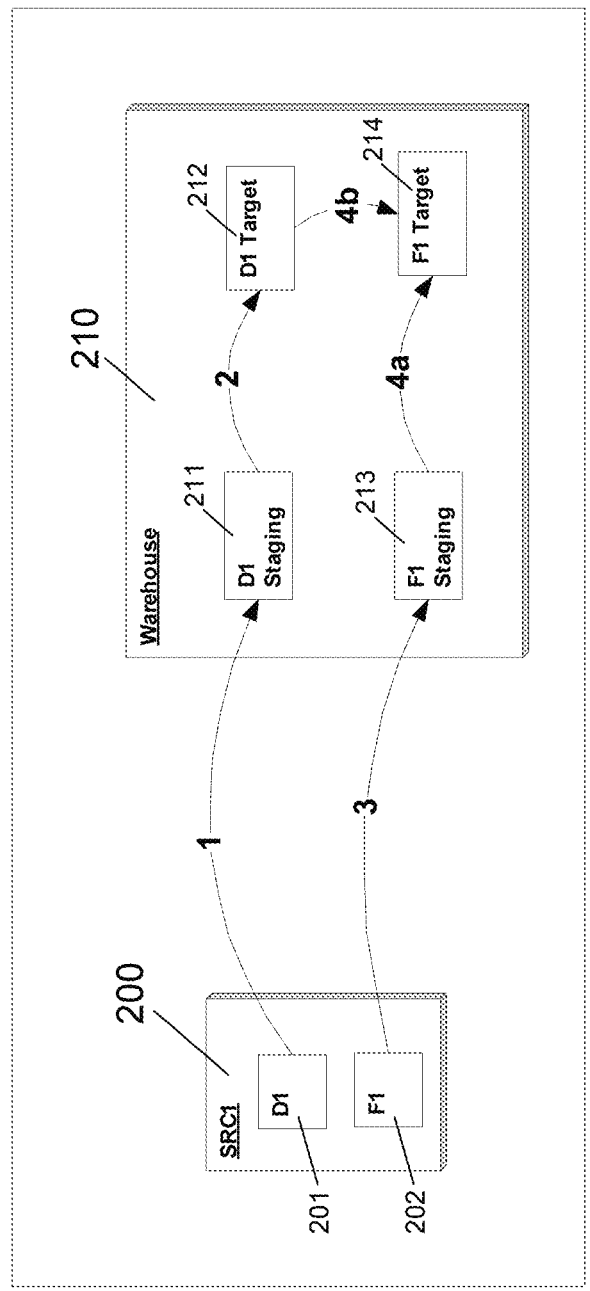
FIG. 2 illustrates a flow diagram of a process that loads data from one source database, according to an embodiment of the invention.

FIG. 2 illustrates a flow diagram of a process that loads data from one source database, according to an embodiment of the invention. In one embodiment, the functionality of the flow diagram of FIG. 2, as well as the functionality of the flow diagrams of FIGS. 3, and 6-13, described below, are each implemented by software stored in a memory or some other computer-readable or tangible medium, and executed by a processor. In other embodiments, the functionality may each be performed by hardware (e.g., through the use of an application specific integrated circuit ("ASIC"), a programmable gate array ("PGA"), a field programmable gate array ("FPGA"), etc.), or any combination of hardware and software. In one embodiment, the functionality of the flow diagrams of FIGS. 2-3 and 6-13 can be implemented by a data de-duplication module (such as data de-duplication module 16 of FIG. 1).

FIG. 2 illustrates a single source database (i.e., source database 200) and a data warehouse 210. Source database 200 contains one or more tables, where each table contains data that is to be loaded into data warehouse 210. More specifically, source database 200 contains a dimension source table 201 that contains source data for a data warehouse dimension table, and a fact source table 202 that contains source data for a data warehouse fact table. The illustrated embodiment is an example embodiment, and in alternate embodiments, source database 200 can contain a plurality of dimension source tables, a plurality of fact source tables, or both a plurality of dimension source tables and a plurality of fact source tables.

Further, data warehouse 210 contains one or more staging tables and one or more target tables. Each staging table can contain data that is received from source database 200 before any processing is performed. Each target table can contain data that is received from source database 200 after any processing is performed. More specifically, data warehouse 210 contains a dimension staging table 211 and a dimension target table 212. Data warehouse 210 also contains a fact staging table 213 and a fact target table 214. The illustrated embodiment is an example embodiment, and in alternate embodiments, data warehouse 210 can contain a plurality of dimension staging tables, a plurality of fact staging tables, or both a plurality of dimension staging tables and a plurality of fact staging tables. Similarly, in alternate embodiments, data warehouse 210 can contain a plurality of dimension target tables, a plurality of fact target tables, or both a plurality of dimension target tables and a plurality of fact target tables.

At 1, dimension data is extracted from dimension source table 201 to dimension staging table 211. At 2, the dimension data stored within dimension staging table 211 is added to dimension target table 212. At 3, fact data is extracted from fact source table 202 to fact staging table 213. At 4a, the fact data stored within fact staging table 213 is added to fact target table 214. At 4b, one or more foreign keys associated with the fact data stored within fact target table 214 are adjusted so that the one or more foreign keys reference the correct dimension data stored within dimension target table 212, thus, forming a star-schema. In certain embodiments, the operations performed at 1 and 3 can be called source-dependent extract ("SDE") operations, because the operations read from a particular source database (e.g., source database 200). In these certain embodiments, the operations performed at 2, 4a, and 4b can be called source-independent load ("SIL") operations, because the operations read from tables whose structure is fixed for data warehouse 210.

When a single source database (such as source database 200) serves as a single source of information, duplicate issues are largely non-problematic. However, it is possible for a single source database to include duplicate dimension source data. For example, errors in the dimension source data stored in the single source database can lead to duplicate dimension data. Such duplicate dimension source data can result in duplicate dimension data being created within the data warehouse. Such scenarios involving duplicate dimension data are further described in relation to FIG. 3.

Figure 3:
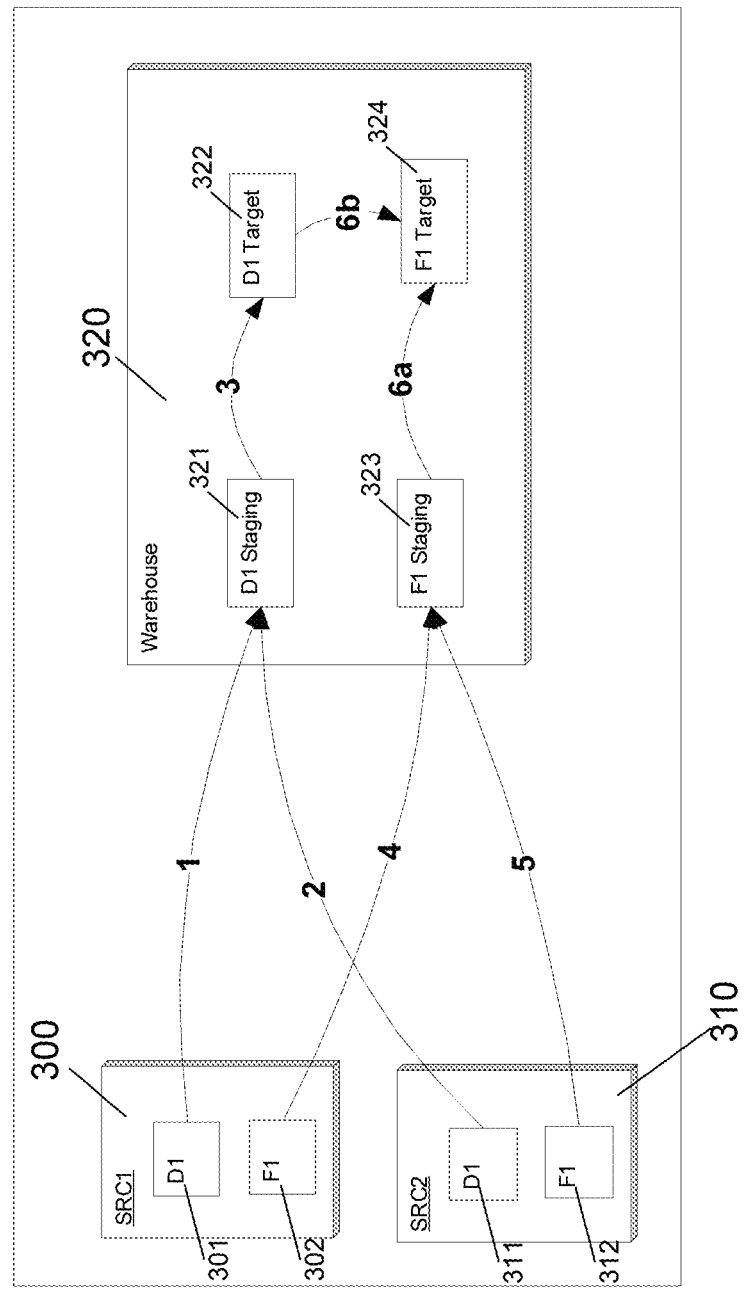
FIG. 3 illustrates a flow diagram of a process that loads data from a plurality of source databases, according to an embodiment of the invention.

FIG. 3 illustrates a flow diagram of a process that loads data from a plurality of source databases, according to an embodiment of the invention. FIG. 3 illustrates two source databases (i.e., source databases 300 and 310), and a data warehouse 320. The illustrated embodiment is an example embodiment, and in alternate embodiments, the plurality of source databases can include any number of source databases. Source database 300 contains a dimension source table 301 that contains dimension source data, and fact source table 302 that contains fact source data. Similarly, source database 310 contains a dimension source table 311 that contains dimension source data, and fact source table 312 that contains fact source data. Source databases 300 and 310 are similar to source database 200 of FIG. 2, and are not further described in greater detail. The illustrated embodiment is an example embodiment, and in alternate embodiments, source database 300 and source database 310 can each contain a plurality of dimension source tables, a plurality of fact source tables, or both a plurality of dimension source tables and a plurality of fact source tables.

Further, data warehouse 320 contains a dimension staging table 321 and a dimension target table 322. Data warehouse 320 also contains a fact staging table 323 and a fact target table 324. Data warehouse 320 is similar to data warehouse 210 of FIG. 2, and is not further described in greater detail. The illustrated embodiment is an example embodiment, and in alternate embodiments, data warehouse 320 can contain a plurality of dimension staging tables, a plurality of fact staging tables, or both a plurality of dimension staging tables and a plurality of fact staging tables.

At 1, dimension source data is extracted from dimension source table 301 to dimension staging table 321. At 2, dimension source data is also extracted from dimension source table 311 to dimension staging table 321. At 3, the dimension data stored within dimension staging table 321 is added to dimension target table 322. At 4, fact source data is extracted from fact source table 302 to fact staging table 323. At 5, fact source data is also extracted from fact source table 312 to fact staging table 323. At 6a, the fact data stored within fact staging table 323 is added to fact target table 324. At 6b, one or more foreign keys associated with the fact data stored within fact target table 324 are set so that the one or more foreign keys reference the correct dimension data stored within dimension target table 322.

In an embodiment with a plurality of source databases, the same dimension source data can appear in multiple source databases, and, thus, can cause duplicate data records to appear in a data warehouse. For example, in an embodiment where source database 300 is an SC database, and source database 310 is an OC database, source databases 300 and 310 can include source tables for dimensions, such as study, site, study-site, investigator, program, and product. If the same actual entity is represented by one or more data records stored in a table in both source databases 300 and 310, this can result in duplicate data records appearing in data warehouse 320. This is because a program loading the data into data warehouse 320 has no way of identifying data records as duplicate data records, and thus, the entire contents of source databases 300 and 310 are loaded into data warehouse 320.

As an example, both source databases 300 and 310 can include one or more instances of a study named "S101," where both references to study "S101" refer to the same study. As another example, source database 300 can include an investigator named "Betsy Smith," and source database 310 can include an investigator named "Elizabeth Smith," yet both references refer to the same investigator. As yet another example, source database 300 can include a study site named "Mass General," and source database 310 can include a study site named "MGH," yet both references refer to the same study site. If no action is taken to identify and merge duplicates, then the loading of data from source databases 300 and 310 can produce duplicate data records within data warehouse 320. More specifically, every study, investigator, study-site, etc., will be treated as a distinct entity, even if they are named identically, and the loading process will have no way to identify which data records to treat as duplicate data records. More specifically, a listing of open queries by study will include two data records for study "S101." Further, a report of number of queries by an investigator will include one or more data records for "Betsy Smith", and one or more data records for "Elizabeth Smith." Since "Betsy Smith" and "Elizabeth Smith" are the same person, the number of queries associated with this investigator will be distorted (i.e., the number of queries will be split between the two different aliases). Even further, a tabulation of number of subjects enrolled in a study-site will include one or more data records for "Mass General," and one or more data records for "MGH." Since "Mass General" and "MGH" are the same study-site, the number of subjects enrolled at this study-site will be distorted (i.e., the number of subjects will be split between the two different study-site aliases). As previously described, this scenario can also occur in an embodiment with a single source database.

A data warehouse can be accessed by an analytical tool to analyze and present the contents of the data warehouse to one or more users by performing one or more analytics queries against the data records stored within the data warehouse. An objective of the data warehouse is to ensure that there is only one representation of each distinct dimension instance (such as study, investigator, or study-site) for each table of the warehouse. This is to ensure accuracy of reports that are generated based on the data stored within the data warehouse (i.e., only one data record that represents each distinct dimension), and to ensure all calculations based on a dimension are accurate, no matter from which source database (or source databases) the dimension originate. The scenarios described above in relation to duplicate dimension data being stored within the data warehouse can frustrate the objective of the data warehouse to provide accurate reports and calculations. The impact of duplicate dimension data is further described in relation to FIGS. 4 and 5.

Figure 4:
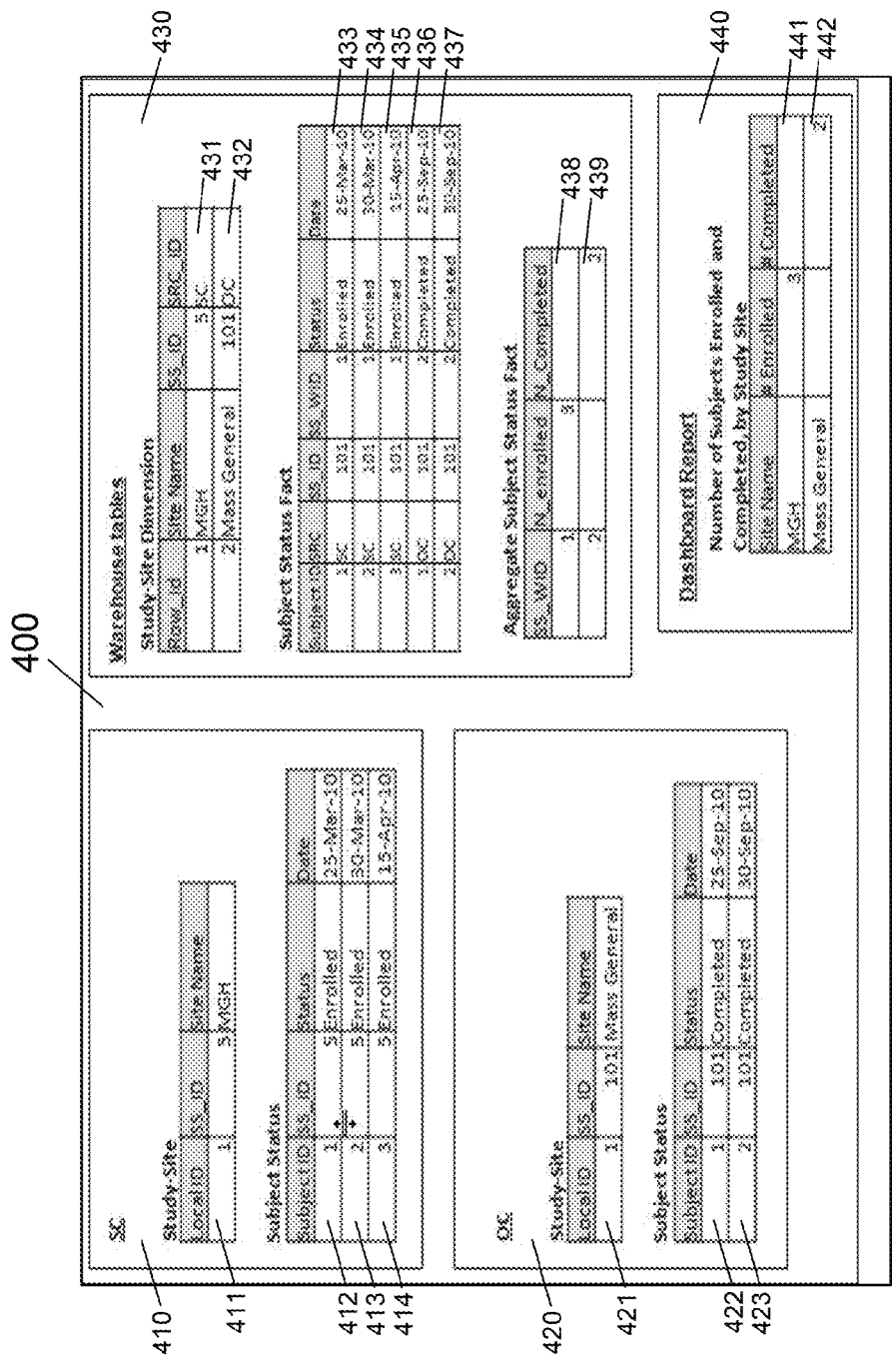
FIG. 4 illustrates a data warehouse system, where duplicates are disregarded, according to an embodiment of the invention.

FIG. 4 illustrates a data warehouse system 400, where duplicates are disregarded, according to an embodiment of the invention. In the illustrated embodiment, data warehouse system 400 includes source databases 410 and 420, data warehouse 430, and dashboard report 440. Source database 410 and source database 420 include a table that serves as a source for a dimension, "study-site." In source database 410, there is a dimension source data record 411 associated with a study-site named "MGH." In source database 420, there is a dimension source data record 421 associated with a study-site named "Mass General." However, these dimension source data records refer to the same study-site, even though the names "MGH" and "Mass General" are different. Source database 410 and source database 420 also include a table that serves as a source for a fact, "subject." In source database 410, there are three fact source data records (i.e., fact source data records 412, 413, and 414), and in source database 420, there are two fact source data records (i.e., fact source data records 422 and 423).

According to the illustrated embodiment, the two dimension source data records (i.e., dimension source data records 411 and 421) are loaded into data warehouse 430 using a loading process similar to the loading process previously described in relation to FIG. 3, and where the loading process disregards the fact that "MGH" and "Mass General" are duplicates, and treats dimension source data records 411 and 421 as separate dimension entities. Because dimension source data records 411 and 421 are treated as different dimension entities, two dimension data records (i.e., dimension data records 431 and 432) are created within data warehouse 430, where dimension data record 431 is associated with study-site "MGH," and where dimension data record 432 is associated with study-site "Mass General."

Further, based on fact source data records 412, 413, and 414 of source database 410, and fact source data records 422 and 423 of source database 420, fact data records 433, 434, 435, 436, and 437 are created within data warehouse 430. As illustrated in FIG. 4, the foreign keys of fact data records 433, 434, 435, 436, and 437 reference two separate dimension entities. More specifically, each foreign key (i.e., each "SS_WID" field) of fact data records 433, 434, and 435 references dimension data record 431 (i.e., the dimension "MGH"), and each foreign key of fact data records 436 and 437 references dimension data record 432 (i.e., the dimension "Mass General").

Based on fact data records 433, 434, 435, 436, and 437, two aggregated data records (i.e., aggregated data records 438 and 439) are created within data warehouse 430, where aggregated data records 438 and 439 aggregate a count of subjects grouped by study-site. Because data warehouse 430 includes two separate dimension data records (i.e., dimension data record 431 and dimension data record 432), two aggregated data records are created instead of a single aggregated data record, where aggregated data record 438 is associated with the dimension "MGH," and aggregated data record 439 is associated with the dimension "Mass General Hospital." Consequently, two entries are created in dashboard report 440 (i.e., dashboard report entries 441 and 442), when, in fact, only one entry should be created in the dashboard report, because dimensions "MGH" and "Mass General Hospital" are actually the same dimension.

As previously described, disregarding duplicates can distort the accuracy of reports that are generated based on the data stored within the data warehouse, and can distort calculations based on a dimension. While in the illustrated embodiment, it may be easy to identify that "MGM" and "Mass General Hospital" are duplicates, and modify the data stored within source databases 410 and 420 to account for these duplicates, in alternate embodiments, source databases 410 and 420 may include hundreds of dimension source data records, and, when extracted, produce data warehouse dimension records associated with the study-sites "MGH" and "Mass General," respectively, that are not on continuous rows of the dimension table. Thus, an end user may not be in a position to decide whether the study-sites "MGH" and "Mass General" constitute the same study-site. Further, in another example, a report of a number of queries by investigator can include a number of investigator names, where an end user cannot readily tell which names that appear identical actually refer to different people, and which names that appear different actually refer to the same person.

Figure 5:
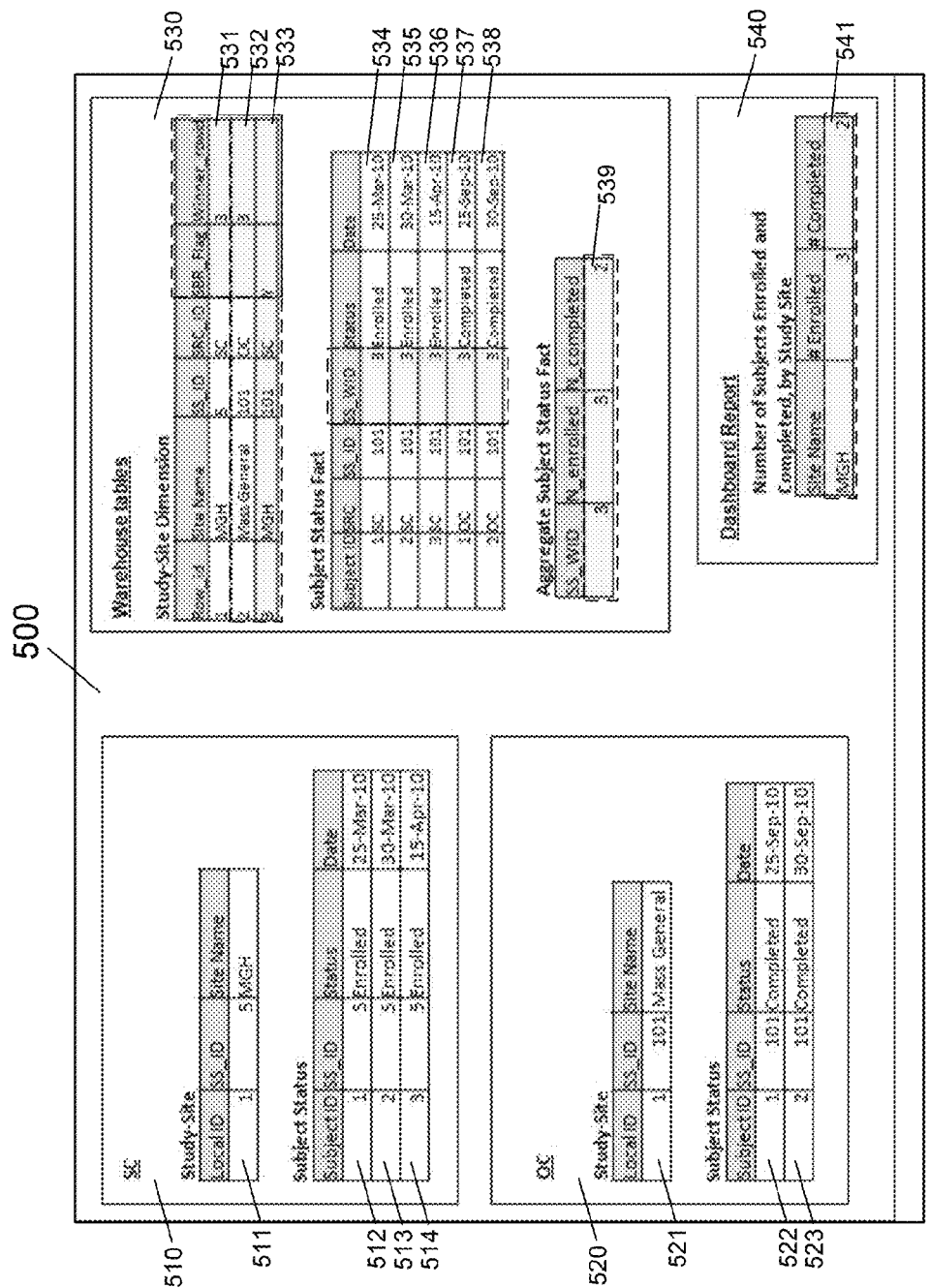
FIG. 5 illustrates a data warehouse system, where duplicates are accounted for, according to an embodiment of the invention.

FIG. 5 illustrates a data warehouse system 500, where duplicates are accounted for, according to an embodiment of the invention. In this embodiment, because duplicates are accounted for, duplicate dimension data is not stored within a data warehouse.

In the illustrated embodiment, similar to the embodiment illustrated in FIG. 4, data warehouse system 500 includes source databases 510 and 520, data warehouse 530, and dashboard report 540. Similar to source database 410 of FIG. 4, source database 510 includes a dimension source data record 511 associated with a study-site named "MGH," and three fact source data records (i.e., fact source data records 512, 513, and 514). Likewise, similar to source database 420 of FIG. 4, source database 520 includes a dimension source data record 521 associated with a study-site named "Mass General," and two fact source data records (i.e., fact source data records 522 and 523).

According to the illustrated embodiment, the two dimension source data records (i.e., dimension source data records 511 and 521) are loaded into data warehouse 530 using a loading process similar to the loading process previously described in relation to FIG. 3, but where the loading process accounts for the fact that "MGH" and "Mass General" are duplicates, and treats dimension source data records 511 and 521 as a single dimension entity. Because dimension source data records 511 and 521 are treated as a single dimension entity, in addition to two dimension data records (i.e., dimension data records 531 and 532) being created within data warehouse 530, where dimension data record 531 is associated with study-site "MGH," and where dimension data record 532 is associated with study-site "Mass General," a third dimension data record (i.e., dimension data record 533) is also created. Dimension data record 533 is a single best record ("SBR") that represents the single dimension entity, and is used to replace dimension data records 531 and 532. Thus, dimension data records 531 and 532 are suppressed and do not appear in any reports generated from data warehouse 530.

Further, based on fact source data records 512, 513, and 514 of source database 510, and fact source data records 522 and 523 of source database 520, fact data records 534, 535, 536, 537, and 538 are created within data warehouse 530. As illustrated in FIG. 5, the foreign keys of fact data records 534, 535, 536, 537, and 538 reference a single dimension entity. More specifically, each of the foreign keys (i.e., each of the SS_WID fields) of fact data records 534, 535, 536, 537, and 538 references dimension data record 533 (i.e., the SBR). Thus, rather than referencing a record representing the study-site in one of source databases 510 and 520, each foreign key references the SBR that represents the merged study-site in data warehouse 530.

Based on fact data records 534, 535, 536, 537, and 538 (stored within data warehouse 530), a single aggregated data record (i.e., aggregated data record 539) is created within data warehouse 530, where aggregated data record 539 aggregates a count of subjects grouped by study-site. Because data warehouse 530 includes an SBR (i.e., dimension data record 533), a single aggregated data record is created instead of two aggregated data records, where aggregated data record 539 is associated with the single dimension entity represented by the SBR (i.e., dimension data record 533). Thus, the counts in aggregated data record 539 correctly show how many enrolled subjects belong to the single study-site, and correctly show how many terminated subjects belong to the single study-site. Consequently, a single entry is created in dashboard report 540 (i.e., dashboard report entry 541), which represents the single study-site, now identified universally as "MGH." Further, an end user reading dashboard report 540 can determine that there have been three enrollments and two terminations at that one study-site. The fact that the information originated from two sources, and the fact that the two sources identified the study-site by different names, can both be successfully hidden from the end user.

To accomplish the changes between the embodiment illustrated in FIG. 4, and the embodiment illustrated in FIG. 5, in one embodiment, the following capabilities can be provided: a capability to identify duplicates in the source database or the plurality of source databases, a capability to merge identified duplicates, and a capability to take the results of merge decisions and apply them to data loaded from the source database (or plurality of source databases) into the data warehouse. According to the embodiment, the data contained within the source database (or the plurality of source databases) is not required to be modified. Also according to the embodiment, the above capabilities can be provided by capturing instructions as to which data records should be considered duplicate data records, and using the captured instructions to act on data that is loaded into a data warehouse based on a data loading process. A process that can provide the above capabilities according to an embodiment is described below in relation to FIG. 6.

Figure 6:
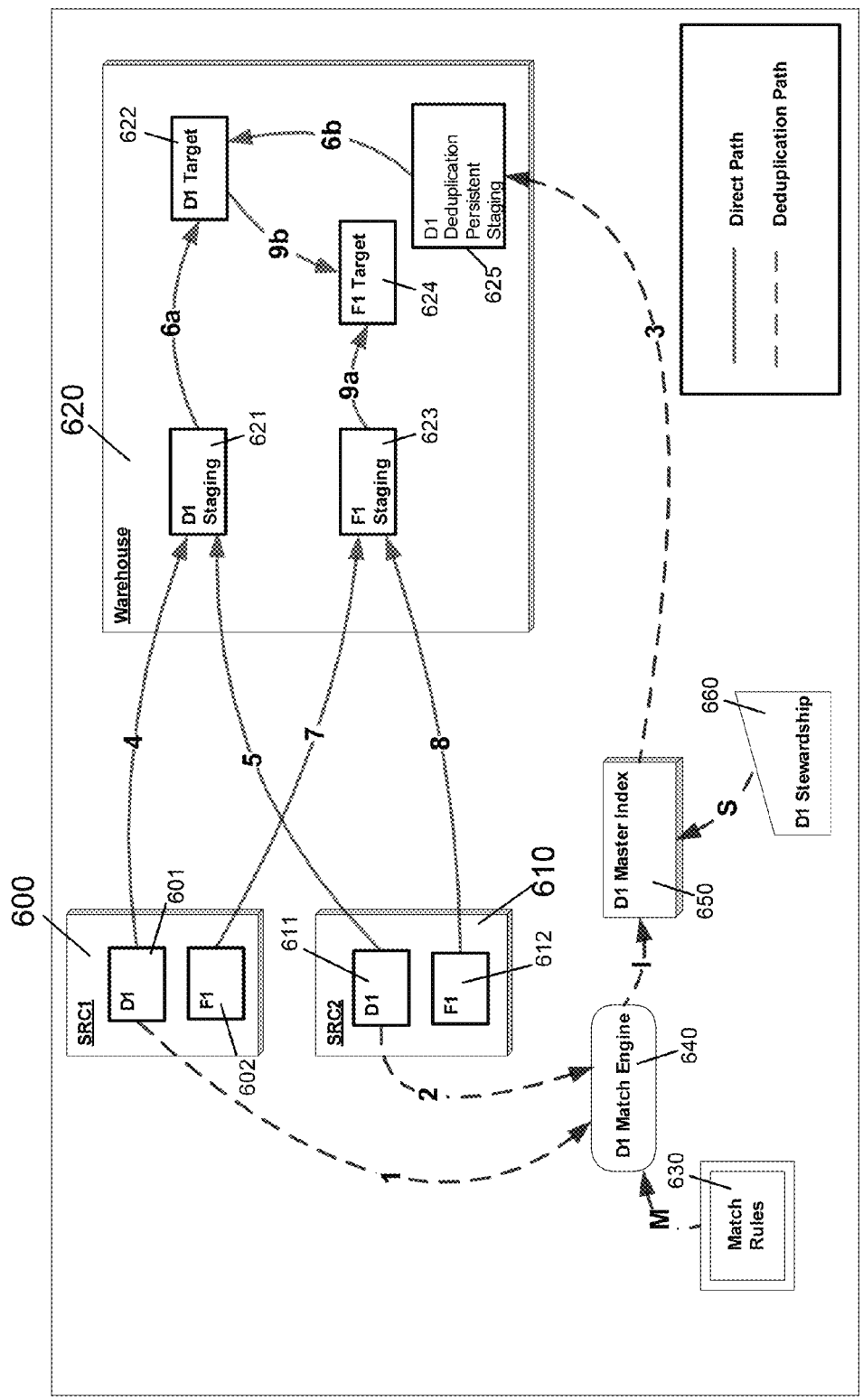
FIG. 6 illustrates a flow diagram of a process that loads data from a plurality of source databases, where duplicates are accounted for, according to an embodiment of the invention.

FIG. 6 illustrates a flow diagram of a process that loads data from a plurality of source databases, where duplicates are accounted for, according to an embodiment of the invention. FIG. 6 illustrates two source databases (i.e., source databases 600 and 610), and a data warehouse 620. The illustrated embodiment is an example embodiment, and in alternate embodiments, the plurality of source databases can include any number of source databases. Source database 600 contains a dimension source table 601 that contains source data for a data warehouse dimension table, and fact source table 602 that contains source data for a data warehouse fact table. Similarly, source database 610 contains a dimension source table 611 that contains source data for a data warehouse dimension table, and fact table 612 that contains source data for a data warehouse fact table. Source databases 600 and 610 are similar to source database 200 of FIG. 2, and are similar to source databases 300 and 310 of FIG. 3, and are not further described in greater detail. The illustrated embodiment is an example embodiment, and in alternate embodiments, source database 600 and source database 610 can each contain a plurality of dimension source tables, a plurality of fact source tables, or both a plurality of dimension source tables and a plurality of fact source tables.

Further, data warehouse 620 contains a dimension staging table 621, a dimension target table 622, a fact staging table 623, a fact target table 624, and one or more de-duplication instruction tables 625. Dimension staging table 621, dimension target table 622, fact staging table 623, and fact target table 624 are similar to dimension staging table 321, dimension target table 322, fact staging table 323, and fact target table 324 of FIG. 3, respectively. As is described below in greater detail, de-duplication instruction tables 625 store de-duplication instructions that identify dimension data records that are considered duplicate dimension data records, and that identify a single dimension data record that represents the duplicate dimension data records. For example, de-duplication instruction tables 625 can store a de-duplication instruction that identifies that dimension data records "John Smith" and "Jonathan Smith" represent the same individual, and thus, are duplicate dimension data records. In this example, the de-duplication instruction also identifies an SBR to use in place of either dimension data record. Records in de-duplication instruction tables 625 persist through multiple data loading processes, and thus, the one or more de-duplication instructions can be applied to the dimension data records before, or after, each data load process.

The illustrated embodiment is an example embodiment, and in alternate embodiments, data warehouse 620 can contain a plurality of dimension staging tables, a plurality of fact staging tables, or both a plurality of dimension staging tables and a plurality of fact staging tables. Further, in alternate embodiments, data warehouse 620 can contain one or more de-duplication instruction tables.

FIG. 6 further illustrates a match rules collection 630, a match engine 640, a master index 650, and a data stewardship capability 660 (identified in FIG. 6 as "stewardship" 660). According to an embodiment, operation 1 extracts dimension source data from dimension source table 601, and converts it to the form of a data warehouse dimension record, comparable to the dimension data records that are created in the dimension target table 622 stored within data warehouse 620 by operations 4 and 6*a*. Similarly, according to an embodiment, operation 2 extracts dimension source data from dimension source table 611, and converts it to the form of a data warehouse dimension record, comparable to the dimension data records that are created in the dimension target table 622 stored within data warehouse 620 by operations 5 and 6*a*. According to the embodiment, match rules collection 630 can store one or more configurable match rules, where a match rule can identify two or more dimension data records that are to be treated as duplicate dimension data records, and where a match rule can specify an SBR that is to take the place of the duplicate dimension records.

Match engine 640 can apply the one or more configurable match rules stored within match rules collection 630 to one or more dimension data records. Based on the application of the one or more configurable match rules, match engine 640 can store each dimension data record within master index 650. According to an embodiment, match engine 640 can also assign each dimension data record stored within master index 650 with one of three states: a clear match to another dimension data record stored within master index 650; a clear non-match to any dimension data record stored within master index 650; or an indeterminate match, requiring data stewardship. In other words, a clear match of a dimension data record and another dimension data record indicates that the two dimension data records are duplicate dimension data records, and a clear non-match of a dimension data record and another dimension data record indicates that the two dimension data records are not duplicate dimension data records.

Data stewardship capability 660 can receive input from a user (such as an administrator) and, based on the input, can reassign a state of a dimension data record that is an indeterminate match to either a clear match to another dimension data record, or a clear non-match to any dimension data record. Thus, data stewardship capability 660 allows the user to make a decision regarding all indeterminate matches.

According to the embodiment, the process illustrated in FIG. 6 includes two processes: a direct path process and a de-duplication path process. The direct path process is a process by which data is loaded, whether or not a de-duplication operation is performed on the data. The direct path process includes operations 4, 5, 6*a*, 6*b*, 7, 8, 9*a*, and 9*b*, as illustrated in FIG. 6. The de-duplication path process is a supplementary process (for dimension data only) that supports identification and confirmation of matches (i.e., duplicates), and the loading of the duplication information into the data warehouse. The de-duplication path process includes operations M, I, S, 1, 2, and 3. In one embodiment, the operations of the de-duplication path process (i.e., operations M, I, S, 1, 2, and 3) can be performed before the operations of the direct path process (i.e., operations 4, 5, 6*a*, 6*b*, 7, 8, 9*a*, and 9*b*). In this embodiment, any duplicates are addressed during the operation of the direct path process. In an alternate embodiment, the operations of the de-duplication path process can be performed after the operations of the direct path processes. In this embodiment, any duplicates are addressed during a subsequent operation of the direct path process.

At M, one or more match rules that are stored at match rules collection 630 are loaded into match engine 640. At 1, dimension source data is extracted from dimension source table 601, converted to a data warehouse dimension format, and sent to match engine 640. At 2, dimension source data is extracted from dimension source table 611, converted to a data warehouse dimension format, and sent to match engine 640. At I, match engine 640 applies the one or more match rules to the dimension data extracted from dimension tables 601 and 611. At I, match engine 640 generates a state for each dimension data record of the dimension data, and stores each dimension data record, along with its corresponding state, in master index 650. As previously described, the state can be one of three states: a clear match to another dimension data record; a clear non-match to any dimension data record; or an indeterminate match, requiring data stewardship. Match engine 640 also generates an SBR associated with a plurality of dimension data records that are identified as duplicate dimension data records. At S, data stewardship capability 660 reassigns a state of each dimension data record that is an indeterminate match to either a clear match to another dimension data record, or a clear non-match to any dimension data record based on input received from a user, such as an administration. At 3, master index 650 generates one or more de-duplication instructions based on the one or more dimension data records stored within master index 650 and the one or more match rules stored within match rules collection 630 and loaded within match engine 640. The one or more de-duplication instructions can identify one or more dimension data records that are considered duplicate dimension data records, and can identify an SBR that represents the duplicate dimension data records. Master index 650 further loads the one or more de-duplication instructions into de-duplication instruction tables 625.

At 4, dimension source data is extracted from dimension source table 601 to dimension staging table 621. At 5, dimension source data is also extracted from dimension source table 611 to dimension staging table 621. At 6*a*, the dimension data stored within dimension staging table 621 is added to dimension target table 622. At 6*b*, the one or more de-duplication instructions stored within de-duplication instruction tables 625 are applied to the dimension data stored within dimension target table 622. By applying the one or more de-duplication instructions, two or more duplicate dimension data records stored within dimension target table 622 are identified and replaced with an SBR. In the example of duplicate dimension data records "John Smith" and "Jonathan Smith," the duplicate dimension data records can be replaced with an SBR that represents both dimension data records. At 7, fact source data is extracted from fact source table 602 to fact staging table 623. At 8, fact source data is also extracted from fact source table 612 to fact staging table 623. At 9*a*, the fact data stored within fact staging table 623 is added to fact target table 624. At 9*b*, one or more foreign keys associated with the fact data are adjusted so that the one or more foreign keys reference the correct dimension data.

In certain embodiments, details of how the SBR is constructed can depend on the capabilities of match engine 640. However, in some embodiments, each SBR draws the value of the majority of its attributes from one of its contributing source dimension data records. This source record can be identified as a "preferred source" for the SBR. The metadata of the SBR can indicate its preferred source.

According to the illustrated embodiment, the direct path process and the de-duplication path process converge during the execution of the direct path process. Specifically, in operation 6b, as previously described, the de-duplication instructions that are received by data warehouse 620 via the de-duplication path process can be applied to the complete set of data that is received by data warehouse 620 via the direct path process. Further, when execution of the process illustrated in FIG. 6 has completed, the de-duplication instructions can be applied to data warehouse 620 for each dimension. For every set of duplicate dimension data records that have been identified, a single SBR can be created within data warehouse 620 that will be accessible by any queries. Further, all foreign key references of the fact data records can be adjusted so they reference an SBR, as appropriate.

Thus, according to the illustrated embodiment, the addition of the de-duplication path process to the direct path process allows the identification and merging of duplicate dimension data records based on the one or more de-duplication instructions stored within de-duplication instruction tables 625. These one or more de-duplication instructions, once applied to the data loaded within data warehouse 620 through the direct path process, can result in the suppression of the duplicate dimension data records in data warehouse 620, in favor of an SBR which takes their place, and can adjust foreign keys of fact data records to reference the merged dimension data records. Further, analytics queries against data warehouse 620 can correctly join fact data records across data sources 600 and 610, and only show one row for each distinct entity in a dimension. Thus, analytics users can be insulated from awareness of duplication of data within data sources 600 and 610, and the analytic reports can be made unambiguous and more useful as a basis for making decisions and taking actions.

According to an embodiment, de-duplication instructions reach data warehouse 620 by way of de-duplication instruction tables 625. De-duplication instruction tables 625 can be queried when the process illustrated in FIG. 6 is executed. Thus, de-duplication instruction tables 625 can become a way in which a user communicates what dimension data records are to be considered duplicate dimension data records, and what dimension data records are not to be considered duplication dimension data records.

The result of the queries of de-duplication instruction tables 625 can be used to drive several possible operations. The first possible operation is a merging of dimension data records within dimension target table 622. If de-duplication instruction tables 625 indicate that two or more dimension data records should be merged and replaced with an SBR, this operation is carried out, as previously described in relation to FIG. 6.

The second operation is an unmerging of dimension data records within dimension target table 622. If, subsequent to two dimension data records being merged, a user decides that the two dimension data records should not be merged, the user can make that change in master index 650. The next time that the process illustrated in FIG. 6 is executed, this change can be applied to de-duplication instruction tables 625, and applied to dimension target table 622. Subsequently, the two or more dimension data records within dimension target table 622 that were merged and replaced with an SBR are restored within dimension target table 622. For example, if dimension data records "John Smith" and "Jonathan Smith" are identified as duplicates, and subsequently merged and replaced with an SBR in dimension target table 622, a decision can be made that dimension data records "John Smith" and "Jonathan Smith" are, in fact, not duplicates. Thus, according to the embodiment, the contents of master index 650 and de-duplication instruction tables 625 can be modified, and when the process illustrated in FIG. 6 is subsequently executed, an unmerge operation can be executed, and the dimension data records "John Smith" and "Jonathan Smith" can be recreated within dimension target table 622. Further, according to the embodiment, every time two or more dimension data records are merged or unmerged, foreign keys of fact data records stored within fact target table 624 can be adjusted so that the reference the correct data record within dimension target table 622. Thus, any data record referencing a merged (or unmerged) data record is automatically updated as well.

Thus, according to an embodiment, the process illustrated in FIG. 6 can address the following scenarios: (a) two or more dimension data records are identified as duplicates before the same two or more dimension data records are loaded via the direct path process; (b) two or more dimension data records are identified as duplicates after they are loaded via the direct path process; (c) after two or more dimension data records have been merged into an SBR within a dimension target table, a preferred source changes; (d) after two or more dimension data records have been merged into an SBR within a dimension target table, one of the dimension data records is deleted; and (3) after two or more dimension data records have been merged into an SBR within a dimension target table, a data stewardship capability decides that the two or more dimension data records should be unmerged.

In certain embodiments, the process illustrated in FIG. 6 does not depend on which match engine is used, which allows a user of the data warehouse to use any match engine, including different match engines for different dimensions. According to these embodiments, the one or more de-duplication instruction tables can become the sole mechanism though which decisions are made to match data records, and how they are to be represented as SBRs, are communicated to the data warehouse. Thus, whatever decisions are made by the match engine, those decisions are translated into records that are inserted into the one or more de-duplication instruction tables. In certain embodiments, these records can be in a pre-determined format, where the format is determined by the one or more de-duplication instruction tables.

Further described below is a description of: (a) information that can be deposited within one or more de-duplication instruction tables; and (b) how a loading process for a data warehouse can process the information in the one or more de-duplication instruction tables in order to make one or more target tables of the data warehouse consistent with decision made during a match engine's processing, according to an embodiment.

According to the embodiment, for each dimension record that is to be de-duplicated, one or more de-duplication instruction tables can be supplied to hold data records for that dimension. Additionally, a mapping table can be supplied to record which dimension data records are to be suppressed in favor of their respective SBR.

In an embodiment, a dimension-specific table can have the following format:

| Column | Purpose |
| --- | --- |
| ROW_ID | Primary Key |
| DATASOURCE_NUM_ID | Source database identifier |
| INTEGRATION_ID | Unique identifier of a dimension of fact entity in its source system. In case of composite keys, the value in this column can comprise concatenated parts |
| PRODUCT_ID | Identification key component |
| STUDY_NAME | Identification key component |

-continued

| Column | Purpose |
| --- | --- |
| ... | Additional identification key components |
| STUDY_PROGRAM_NAME | Attribute of the dimension that depends on the primary key |
| ... | Additional attributes of the dimension |
| CREATED_BY_ID | Bookkeeping |
| ... | Additional bookkeeping attributes |
| EUID | Globally unique ID provided by data de-duplication system |

In the embodiment, a mapping table can have the following format:

| Column | Purpose |
| --- | --- |
| ROW_WID | Primary Key |
| TABLE_NAME | Name of the dimension table containing the records to be merged. |
| SBR_DATASOURCE_ID | Identifier for the database from which the preferred source for the SBR was extracted. |
| SBR_INTEGRATION_ID | Primary key of the preferred source record in its source database |
| DONOR_DATASOURCE_ID | Identifier for the database from which a donor record was extracted. A donor record is a record that is suppressed in a target table in favor of the SBR that represented the same entity as the donor |
| DONOR_INTEGRATION_ID | Primary key of the donor source record in its source database |
| CREATED_BY_ID | Bookkeeping |
| ... | Additional bookkeeping attributes |

Furthermore, according to the embodiment, each dimension table within the data warehouse can have columns such as the following in order to manage data record merging due to de-duplication instructions:

| Column | Purpose |
| --- | --- |
| MERGE_FLAG | Indicates if this data record is contributor to an SBR. If 'Y', this data record is a contributor, and will be supplanted by the SBR, identified in SBR_ROW_WID. If 'N,' the data record is either an SBR or a directly loaded data record that is not a contributor to an SBR. |
| SBR_FLAG | This flag indicates if the data record is the SBR. Value of 'Y'indicates that this is the SBR after a de-duplication process. |
| W_MERGE_DT | Stores the date on which the data record was merged in the data warehouse table. |
| SBR_ROW_WID | If this record is a merged record (MERGE_FLAG = 'Y'), this column stores the ROW_WID (primary key) of the data record that has been identified as the winner that supplants this donor. Otherwise, this column is null. |

FIGS. 7-12 illustrate flow diagrams showing how de-duplication instructions can be loaded into one or more de-duplication instruction tables, and how the de-duplication instructions of the de-duplication instruction tables can be applied to the target tables of a data warehouse. The flow diagrams of FIGS. 7-12 represent the processing of a single dimension. However, the same processes can be followed for each dimension being de-duplicated.

Figure 7:
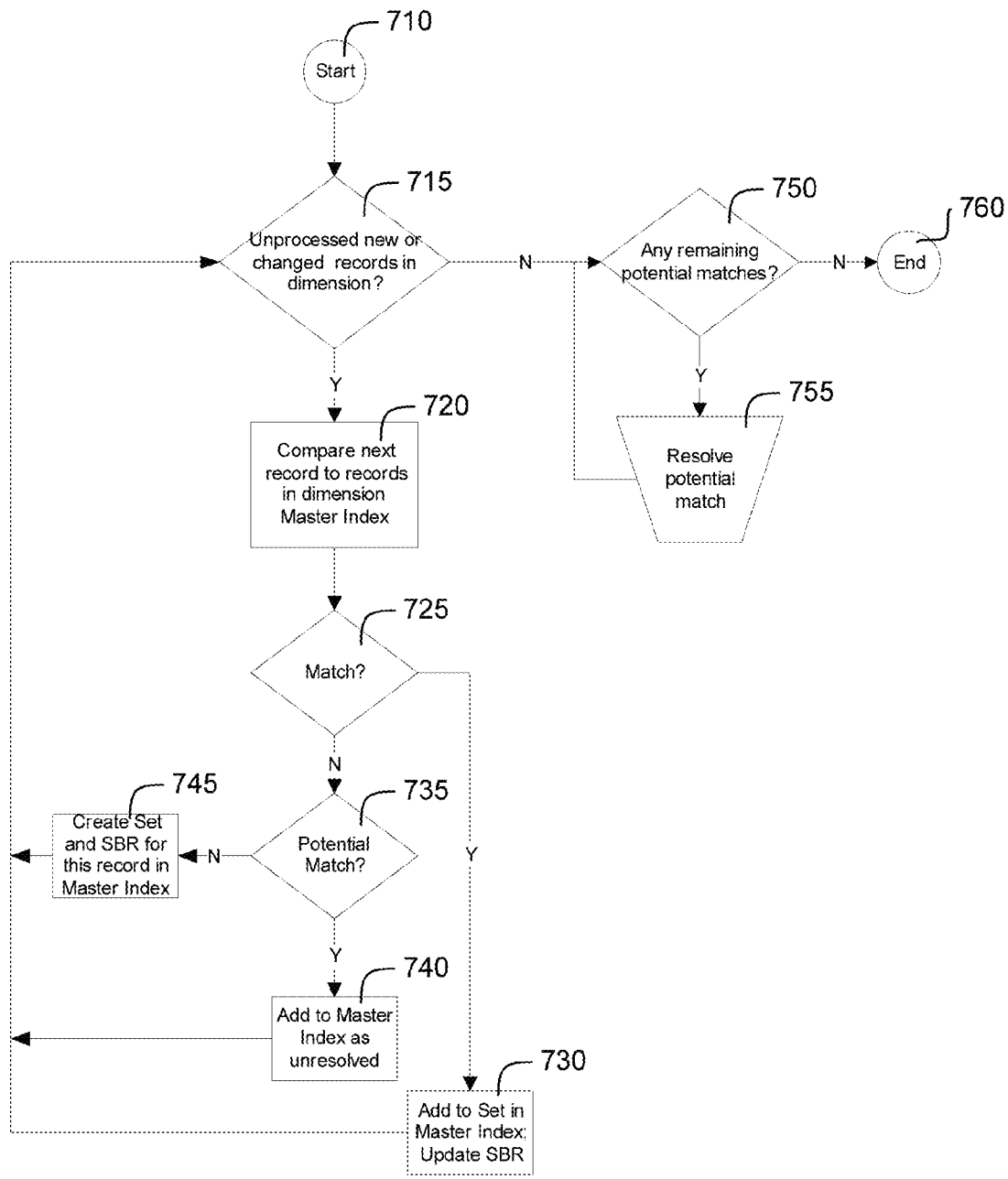
FIG. 7 illustrates a flow diagram of a process that updates a master index of a dimension, according to an embodiment of the invention.

FIG. 7 illustrates a flow diagram of a process that updates a master index of a dimension, according to an embodiment of the invention. According to an embodiment, the master index of a dimension can be updated each time a data load process is executed for the dimension.

At 710, the flow begins and proceeds to 715. At 715, it is determined whether any source tables of a dimension include any unprocessed new or modified dimension source data records. If it is determined that there are any unprocessed new or modified dimension source data records, the flow proceeds to 720. Each unprocessed new or modified dimension source data record is converted to a data warehouse dimension data record format during the progression to 720. If it is determined that there are not any unprocessed new or modified dimension source data records, the flow proceeds to 750.

At 720, the next new or modified dimension data record is compared with the dimension data records within a master index of the dimension. The flow then proceeds to 725. At 725, it is determined whether the new or modified dimension data record matches (i.e., is a duplicate of) at least one dimension data record within the master index. If it is determined that the new or modified dimension data record matches at least one dimension data record within the master index, the flow proceeds to 730. If it determined that the new or modified dimension data record does not match at least one dimension data record within the master index, the flow proceeds to 735.

At 730, the new or modified dimension data record is added to a record set in the master index, and an SBR is updated. A record set can include one or more dimension data records. All of the dimension data records that are members of a record set can be marked as such, and an SBR can be created that holds the values that represent the record set. The flow then loops back to 715. At 735, it is determined whether the new or modified dimension data record potentially matches at least one dimension data record within the master index. If it is determined that the new or modified dimension data record potentially matches at least one dimension data record within the master index, then the flow proceeds to 740. If it is determined that the new or modified dimension data record does not potentially match at least one dimension data record within the master index, then the flow proceeds to 745.

At 740, the new or modified dimension data record is added to the master index as an "unresolved" dimension data record. The flow then loops back to 715. At 745, a record set and SBR is created within the master index for the new or modified dimension data record, and the new or modified dimension data record is added to the record set. The flow then loops back to 715.

At 750, it is determined whether there are any remaining potential matches. In other words, it is determined whether there are any dimension data records within the master index that are "unresolved" dimension data records. If it is determined that there are "unresolved" dimension data records within the master index, the flow proceeds to 755. If is determined that there are not any "unresolved" dimension data records within the master index, the flow proceeds to 760, where the flow ends. At 755, the potential match is resolved. In other words, a data stewardship capability resolves the "unresolved" dimension data record by determining whether the "unresolved" dimension data record matches (i.e., is a duplicate of) at least one dimension data record within the master index. If the "unresolved" dimension data record matches at least one dimension data record within the master index, then the "unresolved" dimension data record is added to a record set in the master index, and an SBR is updated. If the "unresolved" dimension data record does not match at least one dimension data record within the master index, a record set and SBR is created within the master index for the "unresolved" dimension data record, and the "unresolved" dimension data record is added to the record set. In certain embodiments, the data stewardship capability can receive input from a user, and, based on the received input, determine whether the dimension data record matches at least one dimension data record within the master index.

Figure 8:
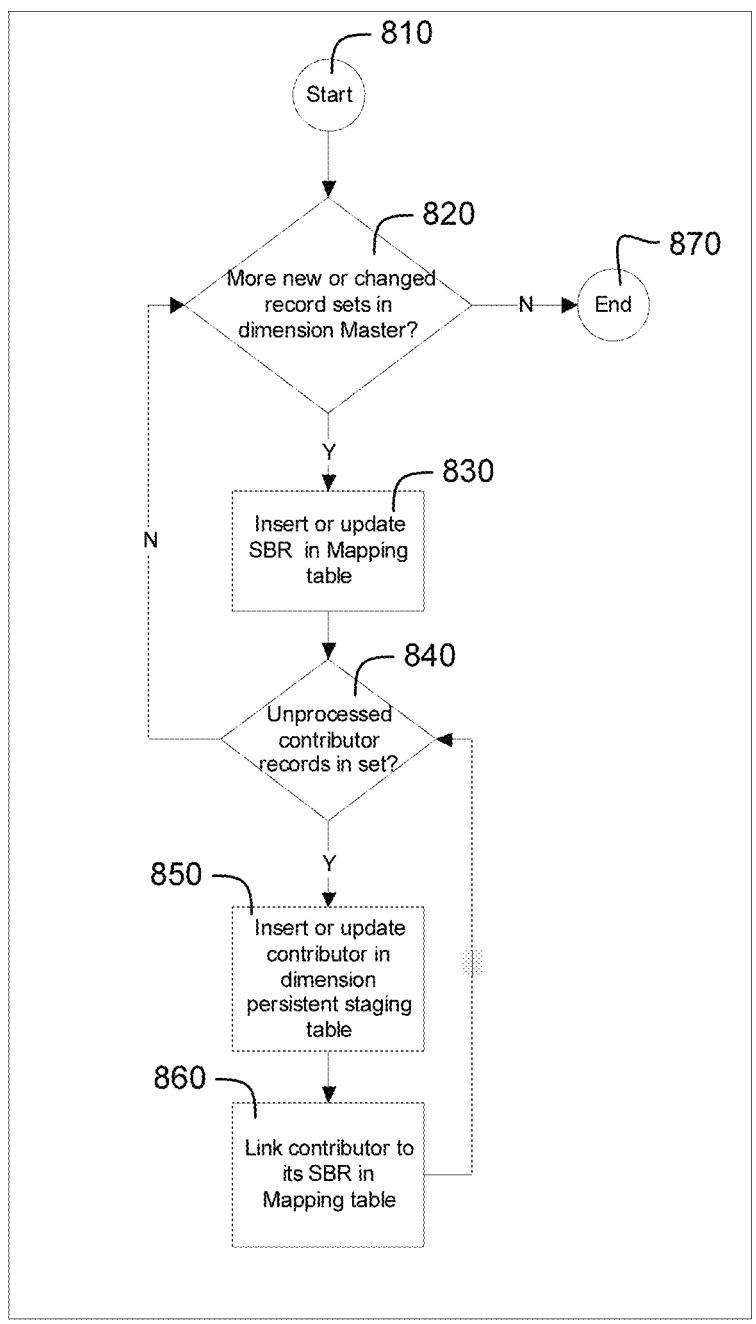
FIG. 8 illustrates a flow diagram of a process that updates one or more de-duplication instruction tables from a master index, according to an embodiment of the invention.

FIG. 8 illustrates a flow diagram of a process that updates one or more de-duplication instruction tables from a master index, according to an embodiment of the invention. According to the embodiment, after a dimension's unprocessed dimension data records have been added to one or more record sets, the results of any new de-duplication decisions can be extracted from the master index, and loaded into one or more de-duplication instruction tables specific to the dimension, and into one or more mapping tables that spans de-duplication instructions for all dimensions. The tables can be persistent because this permits de-duplication to occur out of sequence with a data load process. With the user of one or more de-duplication instruction tables for de-duplication instructions for a dimension data record, de-duplication instructions can arrive prior to a data load of the dimension data record, or the de-duplication instructions can arrive after the data load of the dimension data record. The process that reads the one or more de-duplication instruction tables and looks for de-duplication instructions that meet the following criteria: (a) the de-duplication instruction arrived since the one or more de-duplication instruction tables were last inspected; and (b) the de-duplication instruction has not already been applied.

At 810, the flow begins and proceeds to 820. At 820, it is determined whether there are any new or changed record sets within a master index of a dimension. If it is determined that there are any new or changed record sets within the master index of the dimension, the flow proceeds to 830. If it is determined that there are not any new or changed record sets within the master index of the dimension, the flow proceeds to 870, where the flow ends.

At 830, an SBR is either inserted or updated in a mapping table based on a new or changed record set within the master index of the dimension. More specifically, if the record set is a new record set, an SBR is inserted in the mapping table, where the SBR represents the new record set. If the record set is a changed record set, the SBR is updated in the mapping table to reference the change in the record set (such as one or more new dimension data records that have been inserted or deleted from the changed record set). The flow then proceeds to 840. At 840, it is determined whether there are any unprocessed contributor dimension data records in the record set. As previously described, a contributor dimension data record is a dimension data record that is associated with a record set, and that is ultimately supplanted by an SBR in a target table of a data warehouse. If it is determined that there are any unprocessed contributor dimension data records in the record set, the flow proceeds to 850. If it is determined that there are not any unprocessed contributor dimension data records in the record set, the flow loops back to 820.

At 850, the unprocessed contributor dimension data record is either inserted or updated in one or more de-duplication instruction tables for the dimension. More specifically, if the unprocessed contributor dimension data record is a new contributor dimension data record, then the new contributor dimension data record is inserted in one or more de-duplication instruction tables. If the unprocessed contributor dimension data record is a changed contributor dimension data record, then the changed contributor dimension data record is updated in one or more de-duplication instruction tables. The flow then proceeds to 860. At 860, the contributor dimension data record is linked to a corresponding SBR in the mapping table. The flow then loops back to 840.

In certain embodiments, the process illustrated in FIG. 8 is an incremental load. More specifically, in these embodiments, the process illustrated in FIG. 8 takes only those records in the master index created or modified since a prior execution of a data loading process. The process illustrated in FIG. 8, in certain embodiments, is also a selective load. More specifically, in these embodiments, the process illustrated in FIG. 8 takes only de-duplication instructions concerning record sets of a size greater than one. The process does not take de-duplication instructions concerning record sets of a size of one, since these record sets do not require any changes to the tables of the data warehouse. There can be one exception: if the record set has decreased in size to one, then a corresponding action is needed in the tables of the data warehouse. Thus, in this scenario, the de-duplication instruction can be extracted to the one or more de-duplication instruction tables.

Figure 9:
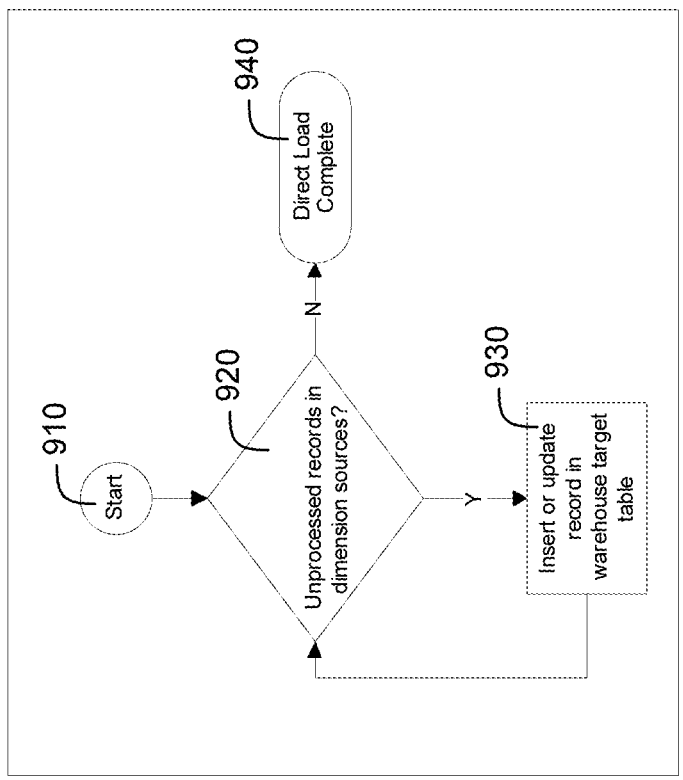
FIG. 9 illustrates a flow diagram of a process that inserts or modifies records in a warehouse table of a dimension, according to an embodiment of the invention.

FIG. 9 illustrates a flow diagram of a process that inserts or modifies data records in a warehouse table of a dimension, according to an embodiment of the invention. According to the embodiment, the process illustrated in FIG. 9 is part of a data load process, such as a direct path process as illustrated in FIG. 6. The process illustrated in FIG. 9 extracts dimension source data records from a plurality of sources, where the dimension source data records have been created or modified since a previous data load process. The process illustrated in FIG. 9 inserts or modifies dimension source data records in one or more tables of a data warehouse.

At 910, the flow begins and proceeds to 920. At 920, it is determined whether there are any unprocessed dimension source data records in one or more dimension source tables of one or more data sources. If there are any unprocessed dimension source data records, the flow proceeds to 930. If there are not any unprocessed dimension source data records, the flow proceeds to 940, where the flow ends.

At 930, the unprocessed dimension source data record is converted to a data warehouse dimension data record format, and then either inserted or updated in one or more target tables of the data warehouse. More specifically, if the unprocessed dimension data record is not present within the one or more target tables, the unprocessed dimension data record is inserted in the one or more target tables. If the unprocessed dimension record is present within the one or more target tables, the unprocessed dimension is updated in the one or more target tables. The flow then loops back to 920.

Figure 10:
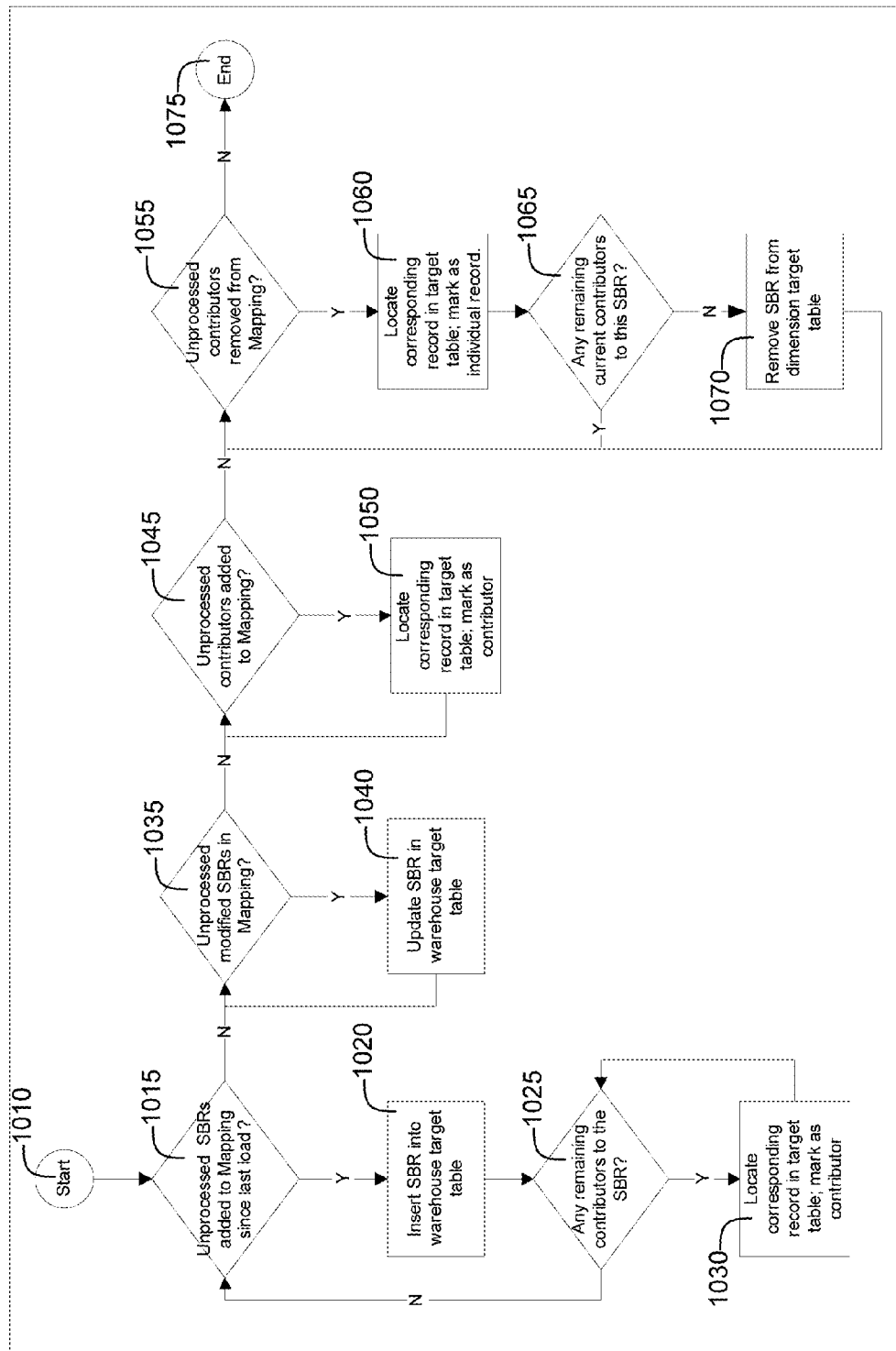
FIG. 10 illustrates a flow diagram of a process that locates and applies de-duplication instructions associated with data records which must be merged or unmerged, according to an embodiment of the invention.

FIG. 10 illustrates a flow diagram of a process that locates and applies de-duplication instructions associated with data records which must be merged or unmerged, according to an embodiment of the invention. According to the embodiment, after a data load process is executed, one or more de-duplication instructions can be applied for a dimension. The one or more de-duplication instructions can be located and applied to dimension data records that are to be merged (or unmerged).

At 1010, the flow begins and proceeds to 1015. At 1015, it is determined whether there are any unprocessed new SBRs that have been added to a mapping table since a data load process was last executed. If there are any unprocessed new SBRs that have been added to the mapping table, the flow proceeds to 1020. If there are not any unprocessed new SBRs that have been added to the mapping table, then the flow proceeds to 1035.

At 1020, a new SBR is inserted into one or more target tables of a data warehouse. Thus, an SBR that represents a plurality of dimension data records is present within the one or more target tables of the data warehouse. The flow then proceeds to 1025. At 1025, it is determined whether there are any remaining contributor dimension data records associated with the SBR. As previously described, a contributor dimension data record is a dimension data record that is associated with a record set, and that is ultimately supplanted by an SBR in a target table of a data warehouse. If there are any remaining contributor dimension data records associated with the SBR, the flow proceeds to 1030. If there are not any remaining contributor dimension data records associated with the SBR, the flow loops back to 1015. At 1030, the contributor dimension data record is located within one or more target tables, and the contributor dimension data record is marked as a contributor. As previously described, when a contributor dimension data record is supplanted by an SBR, the contributor dimension data record is not deleted from the one or more target tables. Instead, the contributor dimension data record is retained within the one or more target tables, and marked as a contributor. This is so the contributor dimension data record can be received if, subsequently, a de-duplication decision to merge the contributor dimension data record is undone. In certain embodiments, the contributor dimension data record is marked as a contributor, by setting a MERGE_FLAG attribute to 'Y' and setting an SBR_ROW_WID attribute to a value of a ROW_WID attribute of the SBR to which the contributor dimension data record contributes. The flow then loops back to 1025.

At 1035, it is determined whether there are any unprocessed modified SBRs in the mapping table. If there are any unprocessed modified SBRs in the mapping table, the flow proceeds to 1040. If there are not any unprocessed modified SBRs in the mapping table, the flow proceeds to 1045. At 1040, an SBR in one or more of the target tables of a data warehouse is updated. The updating of the SBR in one or more of the target tables brings the SBR into alignment with the corresponding modified SBR in the mapping table. The flow then loops back to 1035.

At 1045, it is determined whether any unprocessed contributor dimension data records have been added to the mapping. If there are any unprocessed contributor dimension data records that have been added to the mapping, the flow proceeds to 1050. If there are not any unprocessed contributor dimension data records that have been added to the mapping, the flow proceeds to 1055. At 1050, the contributor dimension data record is located within one or more target tables, and the contributor dimension data record is marked as a contributor. In certain embodiments, as previously described, the contributor dimension data record is marked as a contributor, by setting a MERGE_FLAG attribute to 'Y' and setting an SBR_ROW_WID attribute to a value of a ROW_WID attribute of the SBR to which the contributor dimension data record contributes. The flow then loops back to 1045.

At 1055, it is determined whether any unprocessed contributor dimension data records have been removed from the mapping. If there are any unprocessed contributor dimension data records that have been removed from the mapping, the flow proceeds to 1060. If there are not any unprocessed contributor dimension data records that have been removed from the mapping, the flow proceeds to 1075, where the flow ends. At 1060, the contributor dimension data record is located within one or more target tables, and the contributor dimension data record is marked as an individual dimension data record. In certain embodiments, the contributor dimension data record is marked as an individual dimension data record, by setting a MERGE_FLAG attribute to 'N' and setting an SBR_ROW_WID attribute to NULL. The flow then proceeds to 1065. At 1065, it is determined whether there are any remaining contributor dimension data records associated with the SBR. If there are any remaining contributor dimension data records associated with the SBR, the flow loops back to 1055. If there are not any remaining contributor dimension data records associated with the SBR, the flow proceeds to 1070. At 1070, the SBR is removed from the dimension target table. The flow then loops back to 1055.

Figure 11:
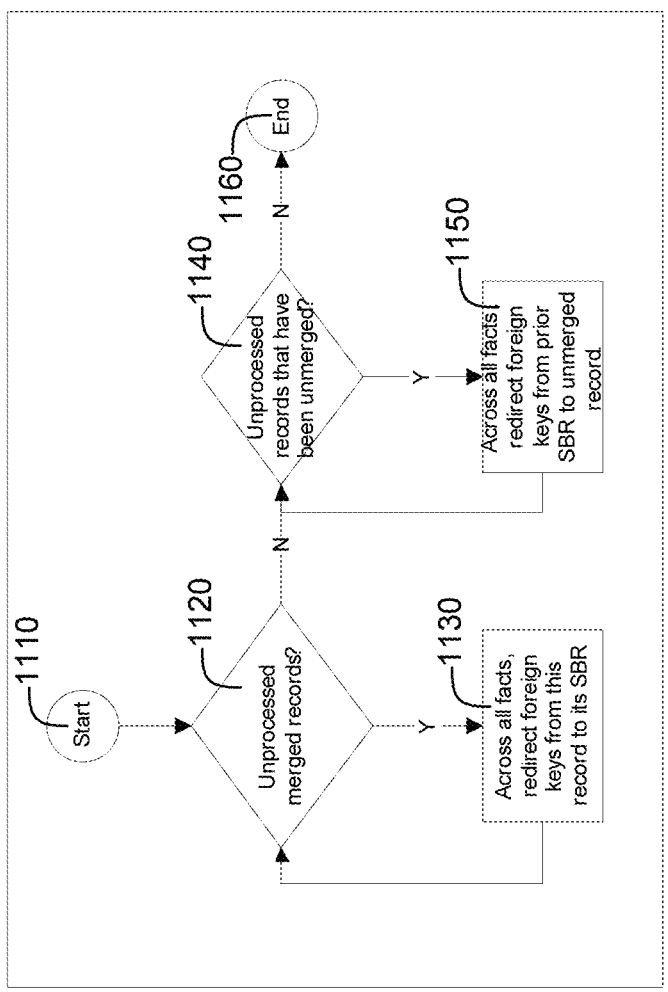
FIG. 11 illustrates a flow diagram of a process that adjusts fact foreign keys in response to merging or unmerging data records, according to an embodiment of the invention.

FIG. 11 illustrates a flow diagram of a process that adjusts fact foreign keys in response to merging or unmerging data records, according to an embodiment of the invention. According to the embodiment, whenever a dimension data record within a dimension target table is identified as a contributor, any foreign keys of one or more fact data records that reference the contributor dimension data record can be adjusted so that the foreign keys instead reference the SBR to which the dimension data record contributes. Therefore, a process that applies a de-duplication instruction to mark a dimension data record as a contributor can also update all appropriate fact data records in one or more fact target tables, adjusting any foreign keys referencing the contributor dimension data record so that they instead reference the corresponding SBR. Furthermore, according to the embodiment, if a de-duplication instruction is received to unmerge a dimension data record, any foreign keys of one or more fact data records that would have referenced the unmerged dimension data record, had it not been merged, can be adjusted so that the foreign keys reference the unmerged dimension data record, rather than the corresponding SBR.

At 1110, the flow begins, and proceeds to 1120. At 1120, it is determined whether there are any unprocessed merged dimension data records. If there are any unprocessed merged dimension data records, the flow proceeds to 1130. If there are not any unprocessed merged dimension data records, the flow proceeds to 1140. At 1130, across all fact data records, one or more foreign keys are re-directed from the merged dimension data record to a corresponding SBR. The flow then loops back to 1120.

At 1140, it is determined whether there are any unprocessed unmerged dimension data records. If there are any unprocessed unmerged dimension data records, the flow proceeds to 1150. If there are not any unprocessed unmerged dimension data records, the flow proceeds to 1160, where the flow ends. At 1150, across all fact data records, one or more foreign keys are re-directed from an SBR that previously corresponded to the unmerged dimension data record to the unmerged dimension data record. The flow then loops back to 1140.

Figure 12:
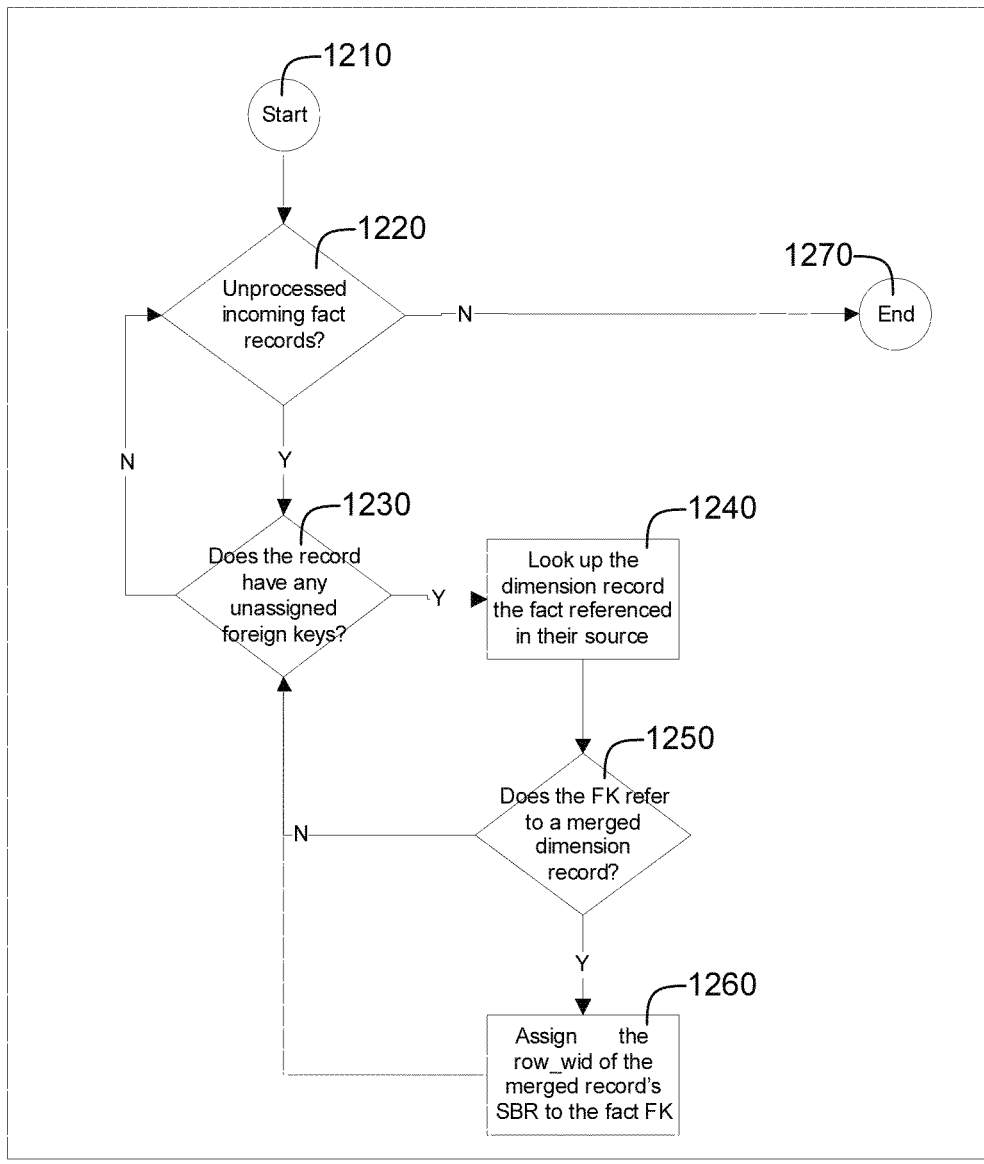
FIG. 12 illustrates a flow diagram of a process that adjusts fact foreign keys during loading of one or more fact data records, according to an embodiment of the invention.

FIG. 12 illustrates a flow diagram of a process that adjusts fact foreign keys during loading of one or more fact data records, according to an embodiment of the invention. According to the embodiment, when a fact data record is loaded, a normal procedure is to set the fact data record's foreign key for a dimension to reference a corresponding dimension data record. This can be done by setting the foreign key to reference a value of a ROW_WID attribute of the corresponding dimension data record. However, if the corresponding dimension data record has been identified as a contributor (e.g., a MERGE_FLAG attribute of the corresponding dimension data record has been set to 'Y'), that dimension data record is no longer available as the target of the foreign key. Thus, according to the embodiment, the fact loading process can set the foreign key to reference a value of an SBR_ROW_WID attribute of the contributor dimension data record.

At 1210, the flow begins and proceeds to 1220. At 1220, it is determined whether there are any unprocessed incoming fact data records. If there are any unprocessed incoming fact data records, the flow proceeds to 1230. If there are not any unprocessed incoming fact data records, the flow proceeds to 1270, where the flow ends.

At 1230, it is determined whether the unprocessed fact data record has any unassigned foreign keys. If the unprocessed fact data record has any unassigned foreign keys, the flow proceeds to 1240. If the unprocessed fact data record does not have any unassigned foreign keys, the flow loops back to 1220. At 1240, the dimension data record referenced by the unprocessed fact data record is looked up. The flow then proceeds to 1250. At 1250, it is determined whether the foreign key references a merged dimension data record. If the foreign key references a merged dimension data record, the flow proceeds to 1260. If the foreign key does not reference a merged dimension data record, the flow loops back to 1230. At 1260, the foreign key of the unprocessed fact data record is assigned to a value of a ROW_WID attribute of an SBR that corresponds to the merged dimension data record. The flow then loops back to 1230.

Figure 13:
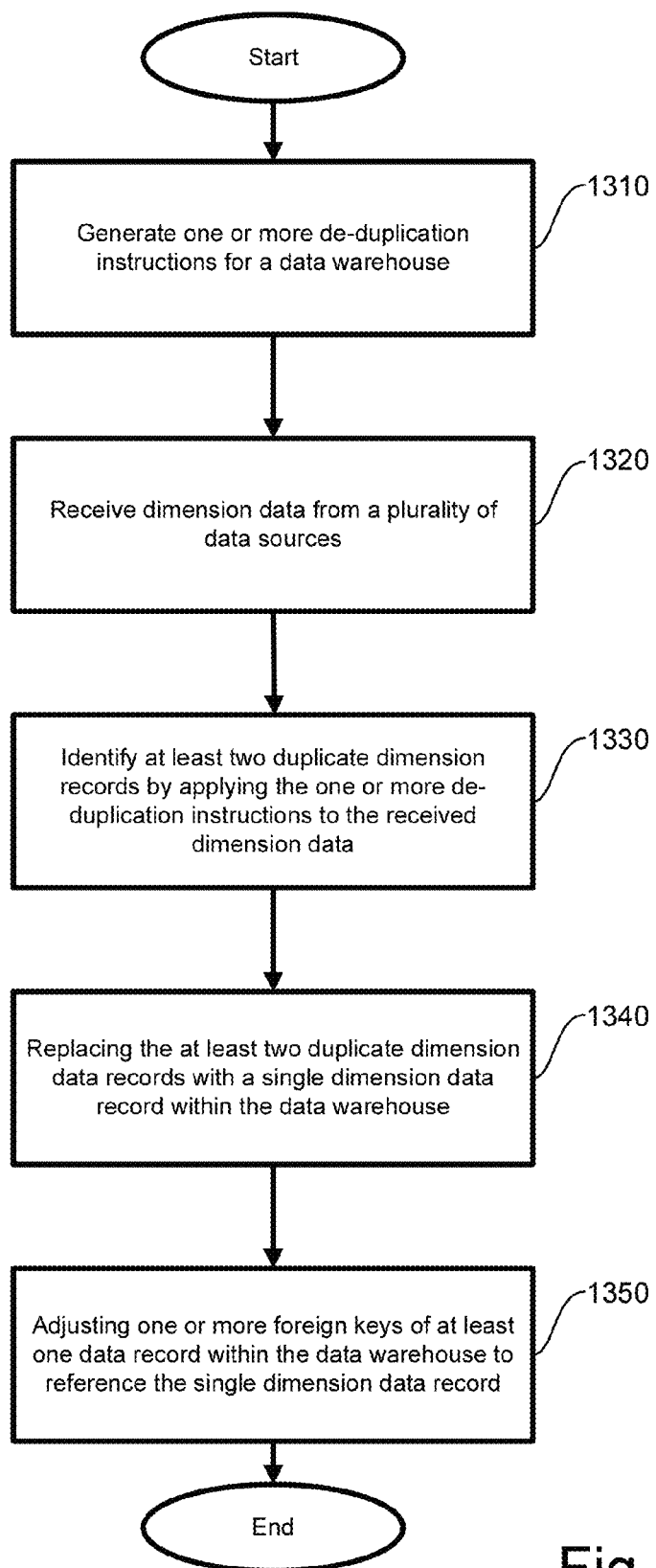
FIG. 13 illustrates a flow diagram of the functionality of a data de-duplication module, according to an embodiment of the invention.

FIG. 13 illustrates a flow diagram of the functionality of a data de-duplication module (such as data de-duplication module 16 of FIG. 1), according to an embodiment of the invention. The flow begins and proceeds to 1310. At 1310, one or more de-duplication instructions are generated for a data warehouse. The one or more de-duplication instructions can identify dimension data records that are considered duplicate dimension data records and can also identify a single dimension data record that represents the duplicate dimension data records. The one or more de-duplication instructions can be stored in one or more de-duplication instruction tables. The one or more de-duplication instruction tables can include at least one de-duplication instruction table for each dimension represented by the dimension data. In certain embodiments, the one or more de-duplication instructions include automated instructions. In other embodiments, the one or more de-duplication instructions are based, at least in part, on input from a user. The flow then proceeds to 1320.

At 1320, dimension data is received from a plurality of data sources. The dimension data can include one or more dimension data records. In certain embodiments, the one or more de-duplication instructions can be generated before the dimension data is received. In other embodiments, the one or more de-duplication instructions can be generated after the dimension data is received. The flow then proceeds to 1330.

At 1330, at least two duplicate dimension data records are identified by applying the one or more de-duplication instructions to the received data. In certain embodiments, the at least two duplicate dimension data records can be identified as duplicate dimension data records because the at least two duplication dimension data records include data associated with a single dimension. The flow then proceeds to 1340.

At 1340, the at least two duplicate dimension data records are replaced with the single dimension data record within the data warehouse. The single dimension data record can include data that represents the single dimension. The single dimension data record can include metadata that identifies the data source that the single dimension data record originates from as a preferred data source. The flow then proceeds to 1350.

At 1350, one or more foreign keys of at least one data record within the data warehouse are adjusted to reference the single dimension data record. In certain embodiments, one or more additional de-duplication instructions can be received. The one or more additional de-duplication instructions can identify dimension data records that are no longer considered duplicate dimension data records. The single dimension data record can be replaced with the at least two duplicate dimension data records within the data warehouse. The one or more foreign keys of the at least one data record within the data warehouse can be adjusted to reference the at least two duplicate dimension data records. Further, in certain embodiments, one or more analytics queries can be performed against the dimension data within the data warehouse. The flow then ends.

Thus, according to an embodiment of the invention, a data de-duplication system is provided that applies one or more de-duplication instructions to override data that is loaded into a data warehouse, and to replace duplicate data records with SBRs that represent the duplicate data records. The use of the data de-duplication system does not require modification to source applications or source databases. The data de-duplication system can be completely flexible with regard to the source applications it supports, and does not impose a burden on a user who has no de-duplication needs.

Further, according to an embodiment, de-duplicated dimension data can be provided within the data warehouse, without the need for any modifications to any source applications, or their databases. The data de-duplication system can thus identify duplicates in dimension sources and replace the duplicates with a single representative data record in the data warehouse dimension. Further, the data de-duplication system can correctly adjust foreign keys of fact data records, as they are loaded, so that they reference the correct dimension data records. According to an embodiment, the data de-duplication system can also include these additional features: (a) blended data records, where the data warehouse record arising from a set of duplicates can be composed as a blend of the attribute values from the different data sources if desires; (b) an unmerge operation, where if two source data records are considered to be duplicates and merged in the data warehouse, and where that decision is subsequently reconsidered, the data de-duplication system can allow the data records to be unmerged, the single data warehouse record to be replaced with the two original data records, and all foreign keys to be realigned; (c) a quasi-merge operation of multiple fact data records that describe the same entity, using the decisions about the dimension data record to determine which fact data record is the winner, where the merged data record can have blended attributes; (d) support for de-duplication of either a single source database or multiple source databases; and (e) all de-duplication instructions can be passed to the data warehouse through a set of interface tables.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to manage duplicate data originating from a plurality of data sources, the managing of the duplicate data comprising:
   generating one or more de-duplication instructions for a data warehouse, wherein the one or more de-duplication instructions identify dimension data records that are considered duplicate dimension data records and identify a single dimension data record that represents the duplicate dimension data records;
   receiving dimension data from a plurality of data sources, wherein the dimension data comprises one or more dimension data records;
   identifying at least two duplicate dimension data records by applying the one or more de-duplication instructions to the received dimension data;
   replacing the at least two duplicate dimension data records with the single dimension data record within the data warehouse;
   adjusting one or more foreign keys of at least one data record within the data warehouse to reference the single dimension data record;
   receiving one or more additional de-duplication instructions, wherein the one or more additional de-duplication instructions identify dimension data records that are no longer considered duplicate dimension data records;
   replacing the single dimension data record with the at least two duplicate dimension data records within the data warehouse; and
   adjusting the one or more foreign keys of the at least one data record within the data warehouse to reference the at least two duplicate dimension data records.

2. The non-transitory computer-readable medium of claim 1, wherein the generating the one or more de-duplication instructions further comprises storing the one or more de-duplication instructions in one or more de-duplication instruction tables.

3. The non-transitory computer-readable medium of claim 2, wherein the one or more de-duplication instruction tables comprises at least one de-duplication instruction table for each dimension represented by the dimension data.

4. The non-transitory computer-readable medium of claim 1, the managing of the duplicate data further comprising performing one or more analytics queries against the dimension data within the data warehouse.

5. The non-transitory computer-readable medium of claim 1, wherein the one or more de-duplication instructions comprise automated instructions.

6. The non-transitory computer-readable medium of claim 1, wherein the one or more de-duplication instructions are based, at least in part, on input from a user.

7. The non-transitory computer-readable medium of claim 1, wherein the one or more de-duplication instructions are generated before the dimension data is received.

8. The non-transitory computer-readable medium of claim 1, wherein the one or more de-duplication instructions are generated after the dimension data is received.

9. The non-transitory computer-readable medium of claim 1, wherein the single dimension data record comprises metadata that identifies the data source that the single dimension data record originates from as a preferred data source.

10. A computer-implemented method for managing duplicate data originating from a plurality of data sources, the computer-implemented method comprising:
    generating one or more de-duplication instructions for a data warehouse, wherein the one or more de-duplication instructions identify dimension data records that are considered duplicate dimension data records and identify a single dimension data record that represents the duplicate dimension data records;
    receiving dimension data from a plurality of data sources, wherein the dimension data comprises one or more dimension data records;
    identifying at least two duplicate dimension data records by applying the one or more de-duplication instructions to the received dimension data;
    replacing the at least two duplicate dimension data records with the single dimension data record within the data warehouse;
    adjusting one or more foreign keys of at least one data record within the data warehouse to reference the single dimension data record;
    receiving one or more additional de-duplication instructions, wherein the one or more additional de-duplication instructions identify dimension data records that are no longer considered duplicate dimension data records;
    replacing the single dimension data record with the at least two duplicate dimension data records within the data warehouse; and
    adjusting the one or more foreign keys of the at least one data record within the data warehouse to reference the at least two duplicate dimension data records.

11. The computer-implemented method of claim 10, wherein the generating the one or more de-duplication instructions further comprises storing the one or more de-duplication instructions in one or more de-duplication instruction tables.

12. The computer-implemented method of claim 11, wherein the one or more de-duplication instruction tables comprises at least one de-duplication instruction table for each dimension represented by the dimension data.

13. The computer-implemented method of claim 10, further comprising performing one or more analytics queries against the dimension data within the data warehouse.

14. A data de-duplication system, comprising:
    a processor;
    a generating module configured to generate one or more de-duplication instructions for a data warehouse, wherein the one or more de-duplication instructions identify dimension data records that are considered duplicate dimension data records and identify a single dimension data record that represents the duplicate dimension data records;
    a receiving module configured to receive dimension data from a plurality of data sources, wherein the dimension data comprises one or more dimension data records;
    an identifying module configured to identify at least two duplicate dimension data records by applying the one or more de-duplication instructions to the received dimension data;
    a replacing module configured to replace the at least two duplicate dimension data records with the single dimension data record within the data warehouse; and an adjusting module configured to adjust one or more foreign keys of at least one data record within the data warehouse to reference the single dimension data record;

wherein the receiving module is further configured to receive one or more additional de-duplication instructions, wherein the one or more additional de-duplication instructions identify dimension data records that are no longer considered duplicate dimension data records;

wherein the replacing module is further configured to replace the single dimension data record with the at least two duplicate dimension data records within the data warehouse; and wherein the adjusting module is further configured to adjust the one or more foreign keys of the at least one data record within the data warehouse to reference the at least two duplicate dimension data records.

15. The data de-duplication system of claim 14, wherein the generating module is further configured to store the one or more de-duplication instructions in one or more de-duplication instruction tables.

16. The data de-duplication system of claim 15, wherein the one or more de-duplication instruction tables comprises at least one de-duplication instruction table for each dimension represented by the dimension data.

17. The data de-duplication system of claim 14, further comprising a query module configured to perform one or more analytics queries against the dimension data within the data warehouse.

* * * * *

UNITED STATES PATENT AND TRADEMARK OFFICE
CERTIFICATE OF CORRECTION

| | | |
|---|---|---|
| PATENT NO. | : 8,799,235 B2 | Page 1 of 1 |
| APPLICATION NO. | : 13/606248 | |
| DATED | : August 5, 2014 | |
| INVENTOR(S) | : Kacher et al. | |

It is certified that error appears in the above-identified patent and that said Letters Patent is hereby corrected as shown below:

In the Specification

In column 15, line 10, delete "Globably" and insert -- Globally --, therefor.

Signed and Sealed this
Third Day of March, 2015

Michelle K. Lee
*Deputy Director of the United States Patent and Trademark Office*